(12) United States Patent
Steinkerchner et al.

(10) Patent No.: US 7,464,650 B2
(45) Date of Patent: Dec. 16, 2008

(54) GROUND HANDLING SYSTEM FOR AN AIRSHIP

(75) Inventors: Brian W. Steinkerchner, Wadsworth, OH (US); Charles E. Housley, Canal Fulton, OH (US); David W. Miller, Stow, OH (US); Paul C. Schweigert, Akron, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 303 days.

(21) Appl. No.: 11/384,079

(22) Filed: Mar. 17, 2006

(65) Prior Publication Data

US 2007/0215752 A1  Sep. 20, 2007

(51) Int. Cl.
*B60S 13/02* (2006.01)
*B61J 1/10* (2006.01)
*B61J 1/12* (2006.01)

(52) U.S. Cl. .................................................. 104/48
(58) Field of Classification Search .............. 104/31
See application file for complete search history.

(56) References Cited

U.S. PATENT DOCUMENTS

| 1,351,931 A | 9/1920 | Ullmann |
| 1,706,414 A | 3/1929 | Schnitzer |
| 2,150,428 A | 3/1939 | Crum et al. |
| 3,905,567 A | 9/1975 | Menke et al. ............... 244/115 |
| 4,171,178 A * | 10/1979 | Birkenfeld et al. .......... 414/790 |
| 4,402,479 A | 9/1983 | Phipps, III et al. .......... 244/116 |
| 4,421,286 A | 12/1983 | Laky et al. .................... 244/166 |
| 5,143,323 A | 9/1992 | Husain et al. ................ 244/166 |
| 5,431,359 A * | 7/1995 | Belie ............................ 244/116 |
| 5,497,962 A | 3/1996 | Wood .......................... 244/116 |
| 5,516,061 A | 5/1996 | Glasgow .................... 244/53 R |

FOREIGN PATENT DOCUMENTS

| DE | 2493311 | 3/1910 |
| FR | 1282164 | 12/1962 |
| GB | 127041  | 5/1919 |

* cited by examiner

*Primary Examiner*—S. Joseph Morano
*Assistant Examiner*—Daniel V Venne
(74) *Attorney, Agent, or Firm*—Renner Kenner Greive Bobak Taylor & Weber

(57) ABSTRACT

A ground handling system for an airship which comprises a first track system to allow a plurality of docking carts to move from a hangar to a weathervane/launching/landing ring R. The docking carts are configured to complete a second track system. Carried by each of the docking carts is a mooring cart that carries a mooring structure. Upon the completion of the second track system by each of the docking carts, the mooring carts are able to move about the second track system. Thereby allowing the airship to be oriented in a desired manner to facilitate its launch or landing.

18 Claims, 31 Drawing Sheets

GROUND HANDLING SYSTEM FOR AN AIRSHIP

GOVERNMENT LICENSE RIGHTS

The U.S. Government may have a paid-up license in this invention and the right in limited circumstances to require the patent owner to license others on reasonable terms as provided for by the terms of Contract No. HQ0006-04-9-0001 awarded by the Missile Defense Agency—Department of Defense.

TECHNICAL FIELD

The present invention is generally related to a ground handling system for an airship. Particularly, the present invention relates to a ground handling system that utilizes a plurality of mooring structures to launch and capture an airship. More particularly, the present invention is directed to a ground handling system that allows an airship to move along a designated path from a hangar to a weathervane ring for launching/landing.

BACKGROUND ART

Conventional airships, when not in flight, are maneuvered on the ground using a mooring device attached to the nose of the airship, and a plurality of handling lines. The handling lines are attached to various attachment points on the external surface of the body of the hull, or envelope of the airship, including the tail and nose sections of the airship. The attachment points often extend outwardly from the envelope of the airship, thus altering the envelope's smooth uniform surface. As such, the attachment points are a source of increased drag on the airship while it is in flight. Motorized vehicles and mooring masts are often attached to the free end of the handling lines to control the lateral and vertical movement of the airship as it is moved.

The mooring device is used in conjunction with the handling lines to provide additional control over the airship as it is moved on the ground. The mooring device comprises a nose cone and battens that are permanently attached to the airship's nose. The battens extend above the surface of the envelope, thus creating additional discontinuous or uneven surfaces that generate air drag while the airship is in flight. During the maneuvering of the airship on the ground, the battens and nose cone are attached to a large movable platform structure that is designed to be removably attached thereto. Underneath the platform, wheels are included that allow the platform, and attached airship to be maneuvered by a motorized vehicle.

Because increased air drag on the hull is not a significant concern for a conventional airship, the use of handling lines and the mooring device are deemed effective for maneuvering such conventional airship on the ground. However, for airships utilizing a low-drag envelope, such as a high-altitude airship, such handling lines and mooring devices using nose cones and battens create unwanted air disturbances in the laminar air stream that passes over the surface of the low-drag hull.

Therefore, there is a need for a ground handling system that does not utilize mooring masts, nose cones, and battens. Additionally, there is a need for a ground handling system that reduces the number of attachment points on the airship.

DISCLOSURE OF THE INVENTION

In light of the foregoing, it is a first aspect of the present invention to provide a ground handling system for an airship.

It is another aspect of the present invention to provide a ground handling system for an airship which comprises a first track system, a second track system, and a plurality of docking carts configured to move on one of the track systems, the plurality of docking carts each carrying a mooring cart configured to move on the other of the track systems.

BRIEF DESCRIPTION OF THE DRAWINGS

For a complete understanding of the objects, techniques and structure of the invention, reference should be made to the following detailed description and accompanying drawings, wherein.

DETAILED DESCRIPTION OF THE INVENTION

Figure 1A:
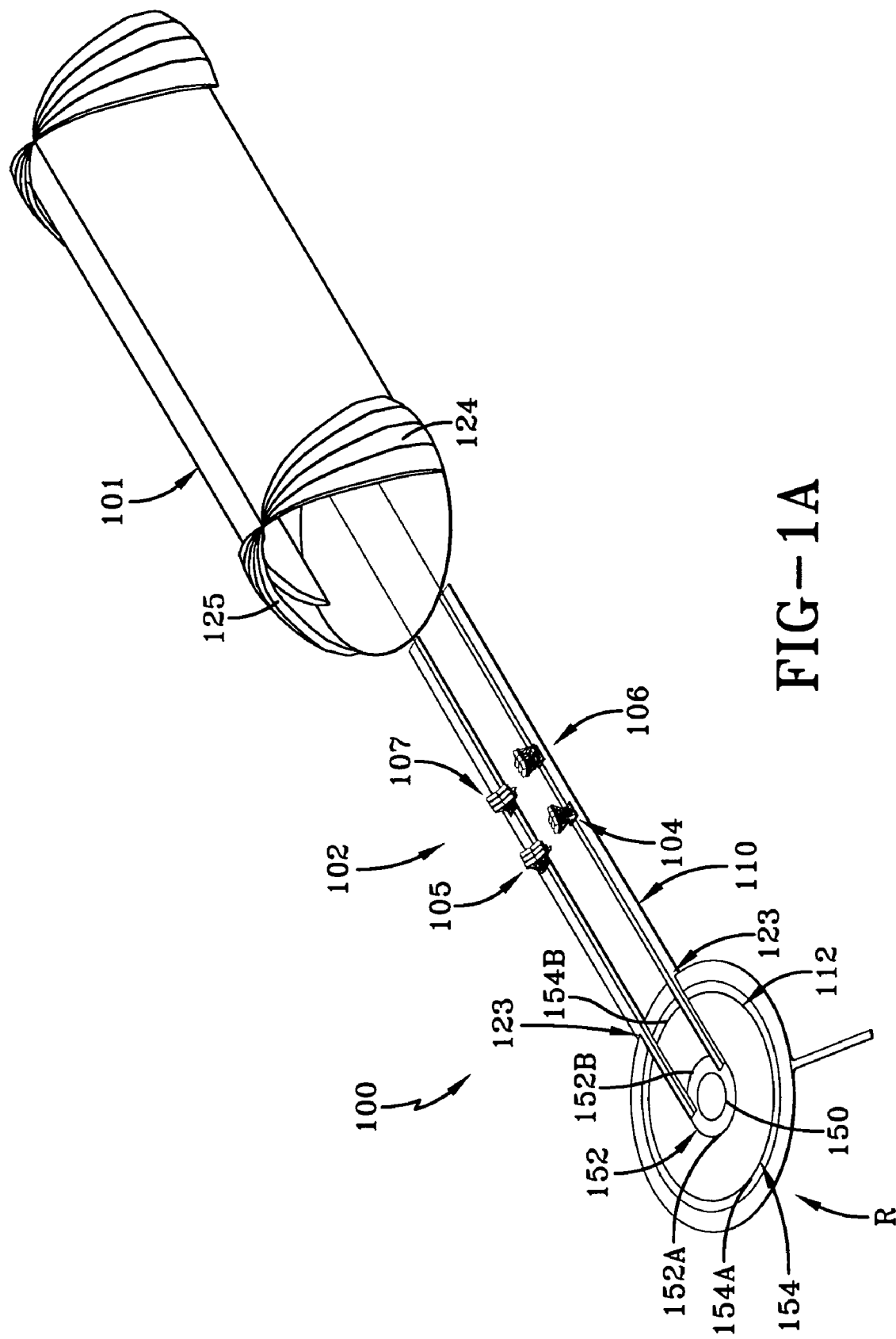
FIG. 1A is a schematic perspective view of a ground handling system according to the present invention depicting an airship docking system positioned at an intermediate position between an airship hangar and a weathervane/launching/landing ring.
Figure 1B:
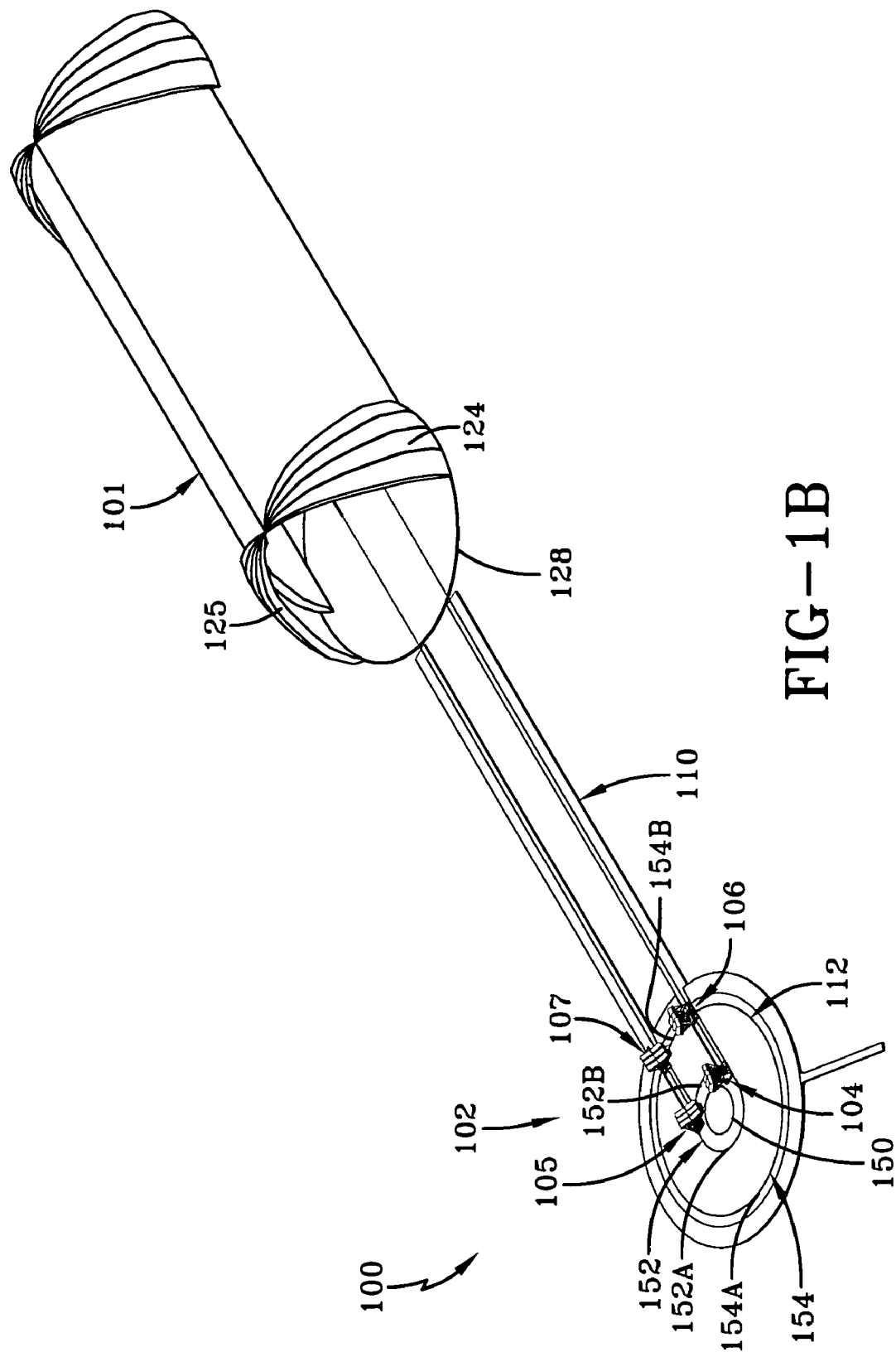
FIG. 1B is a schematic perspective view of the ground handling system according to the present invention depicting the airship docking system transitionally positioned within the weathervane/launching/landing ring.
Figure 1C:
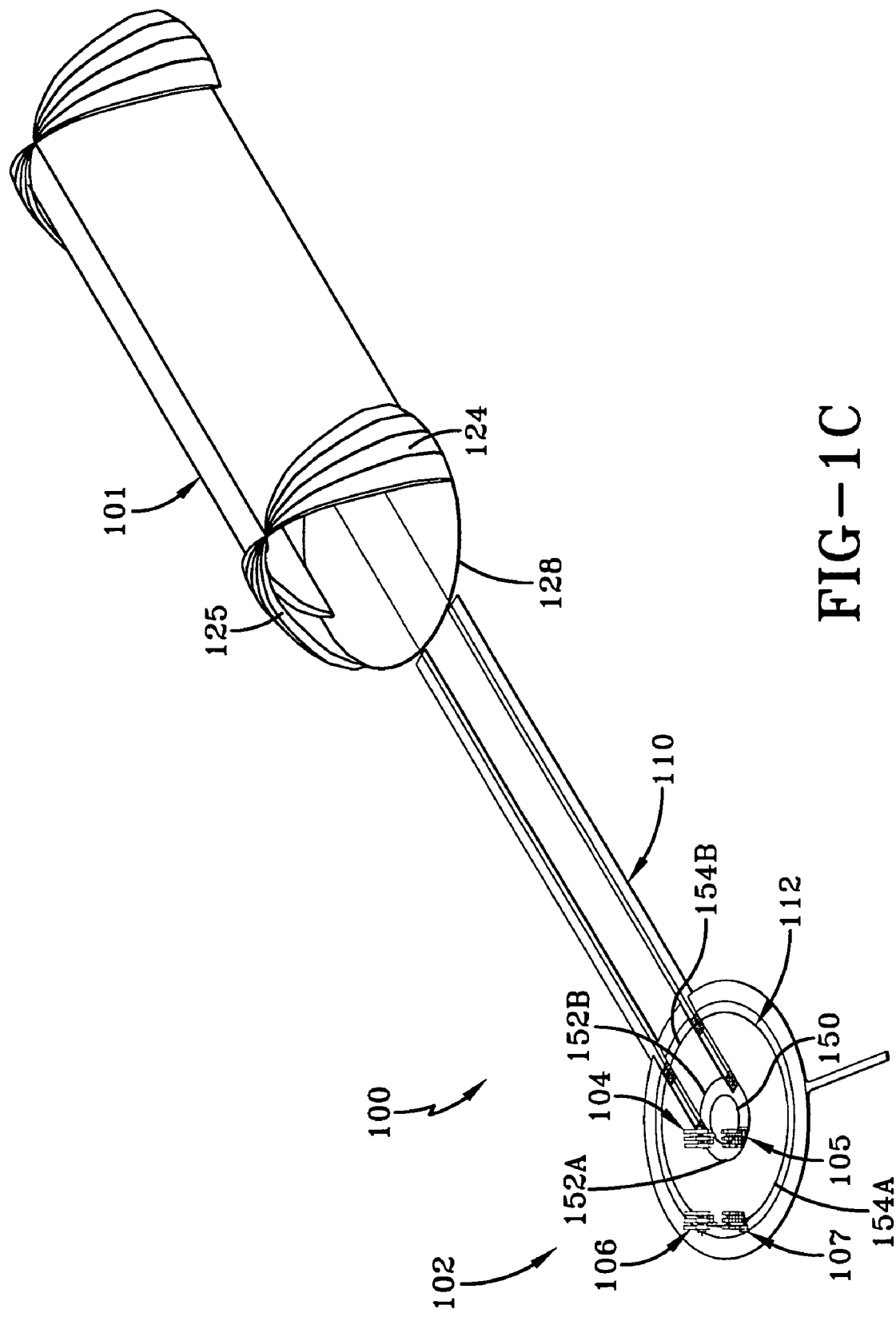
FIG. 1C is a schematic perspective view of the ground handling system according to the present invention depicting the airship docking system oriented about the weathervane/launching/landing ring.

A ground handling system in accordance with the concepts of the present invention is generally designated by the numeral 100 in the accompanying drawings. As shown in FIGS. 1A, 1B, and 1C, the ground handling system 100 is provided to transport an airship (not shown) between a hangar 101 and a weathervane/launching/landing ring R where the airship can be released and captured. It should also be appreciated that while the following discussion of the handling system 100 refers to the term airship, the discussion should not be limited thereto, as the handling system 100 may be used with blimps, dirigibles, aerostats, or other lighter-than-air vehicles, including high altitude airships.

Before launching the airship, components of the ground handling system 100 properly orient the airship in the desired direction of ascent. After its launch, the ground handling system 100 can be positioned to enable capture of the airship. When capturing the airship, the components of the ground handling system 100 are positioned to accommodate the orientation of the pressurized airship during its descent. Once the pressurized airship is captured, the ground handling system 100 transports the airship from the weathervane/launching/landing ring R to the hangar 101 where the airship is stored and needed maintenance can be performed.

Figure 2:
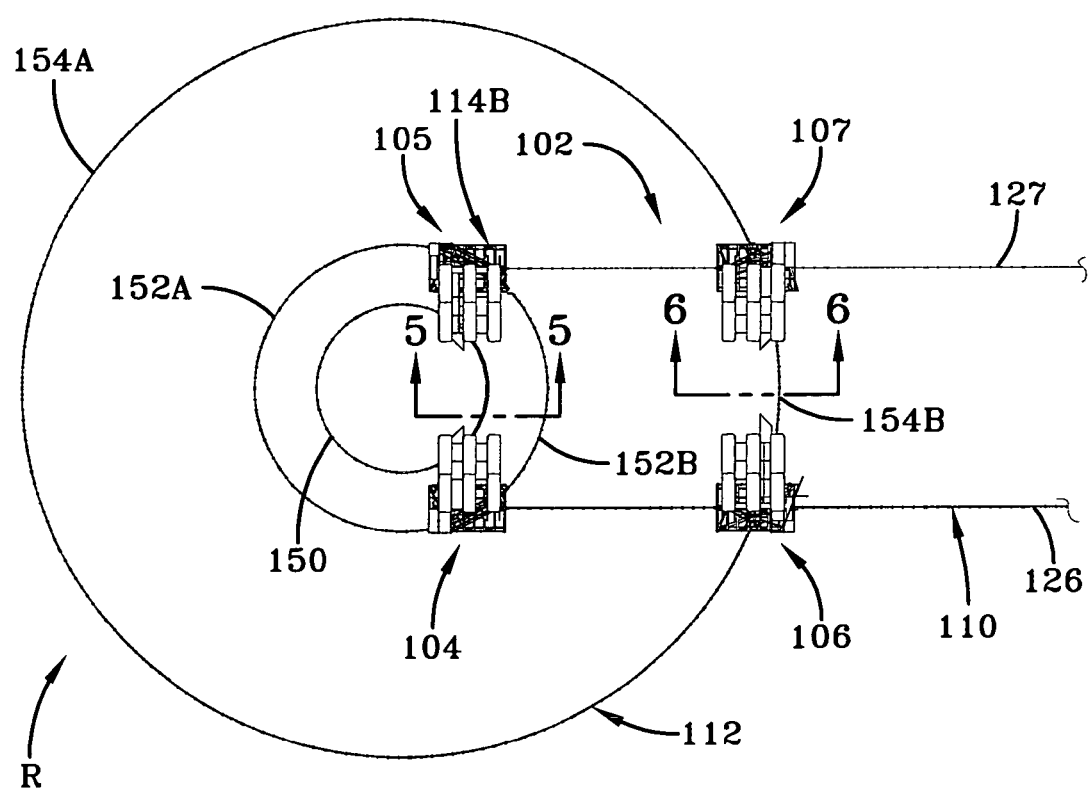
FIG. 2 is a top plan view of the ground handling system according to the present invention depicting the airship docking system transitionally positioned on the weathervane/launching/landing ring.
Figure 3:
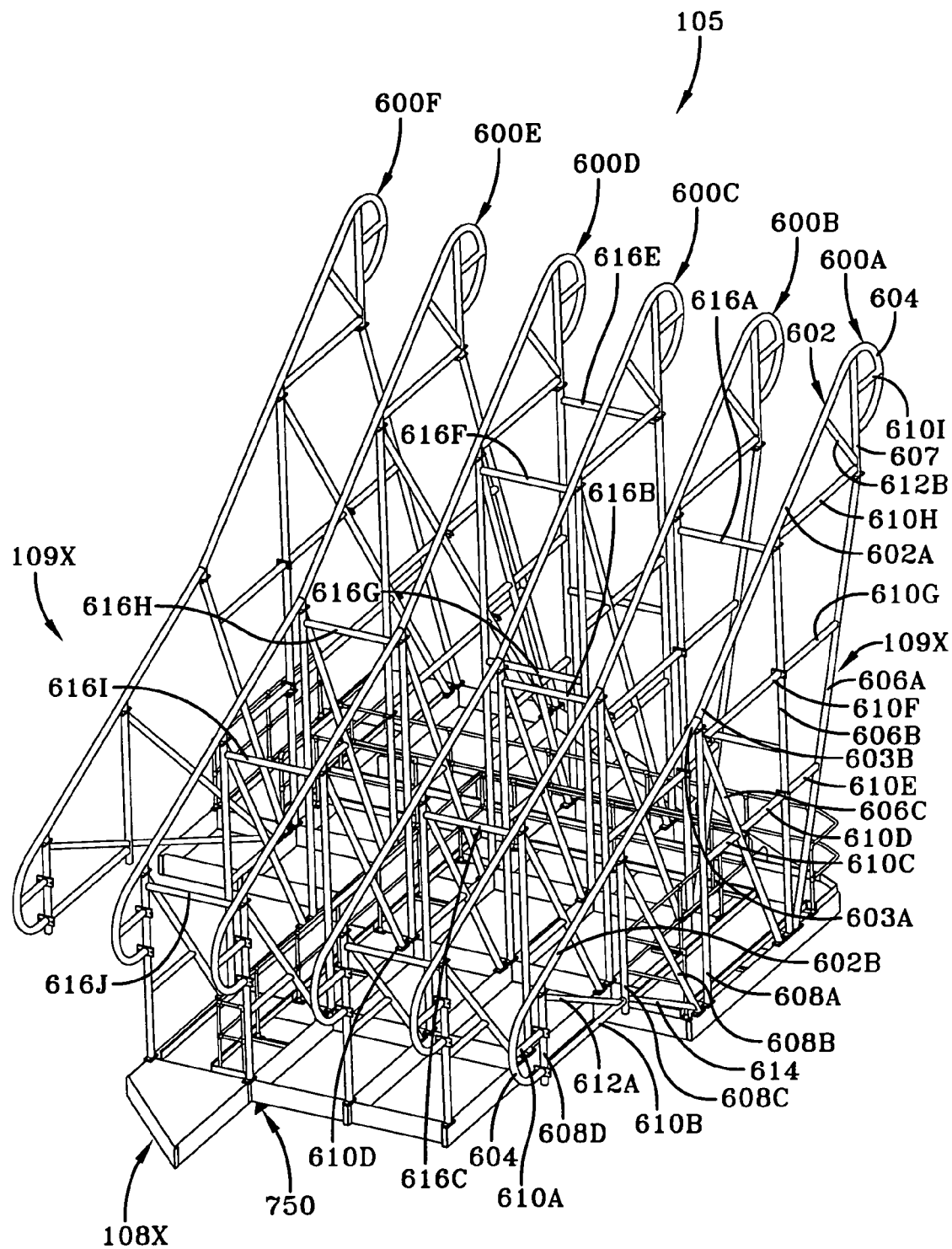
FIG. 3 is a perspective view of a forward starboard mooring structure which is part of the airship docking system.
Figure 4:
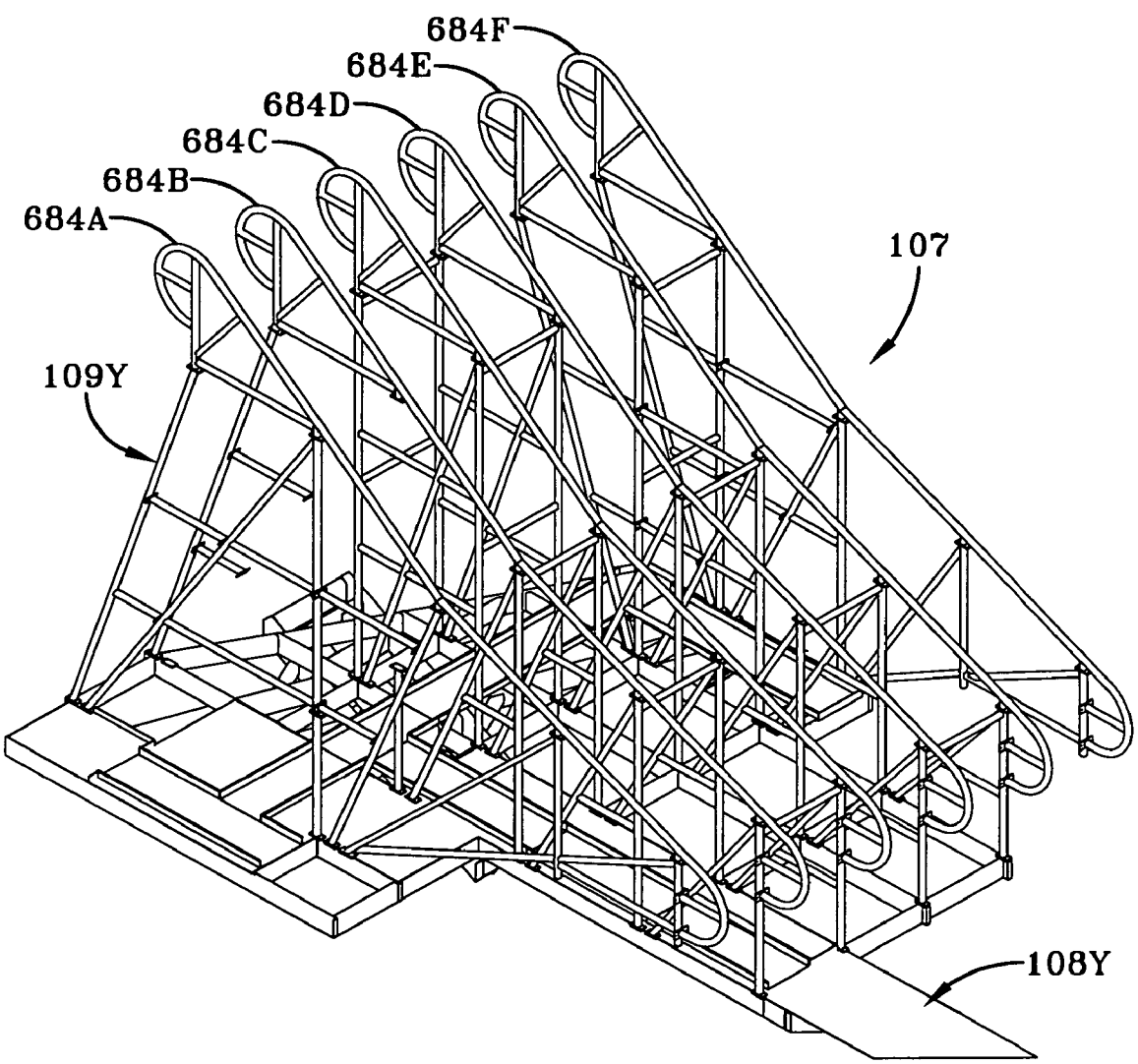
FIG. 4 is a perspective view of an aft starboard mooring structure, which is part of the airship docking system.

The ground handling system 100 includes an airship docking system 102 including four (4) mooring structures 104, 105, 106, and 107, as shown in FIG. 2. As discussed below, the airship docking system 102 is used to cradle the airship before its release and after its capture. The mooring structures 104 and 105 are forward port and starboard mooring structures, respectively, and the mooring structures 106 and 107 are aft port and starboard mooring structures, respectively. The forward starboard mooring structure 105, which is a mirror image of forward port mooring structure 104, is depicted in FIG. 3, and the aft starboard mooring structure 107, which is a mirror image of aft port mooring structure 106, is depicted in FIG. 4. The forward mooring structures 104 and 105 are each formed from a mooring platform 108X and a scaffolding system 109X, and the aft mooring structures 106 and 107 are each formed from a mooring platform 108Y and a scaffolding system 109Y.

Returning to FIG. 2, the mooring structures 104, 105, 106, and 107 are movable between the hangar 101 and the weathervane/launching/landing ring R using a straight track system 110. To position the airship (not shown) for its release or capture, the mooring structures 104-107 are positioned about weathervane/launching/landing ring R using a ring track system 112. The track systems 110 and 112 are formed using various rails on which various docking carts and various mooring carts respectively ride as discussed below.

Figure 5:
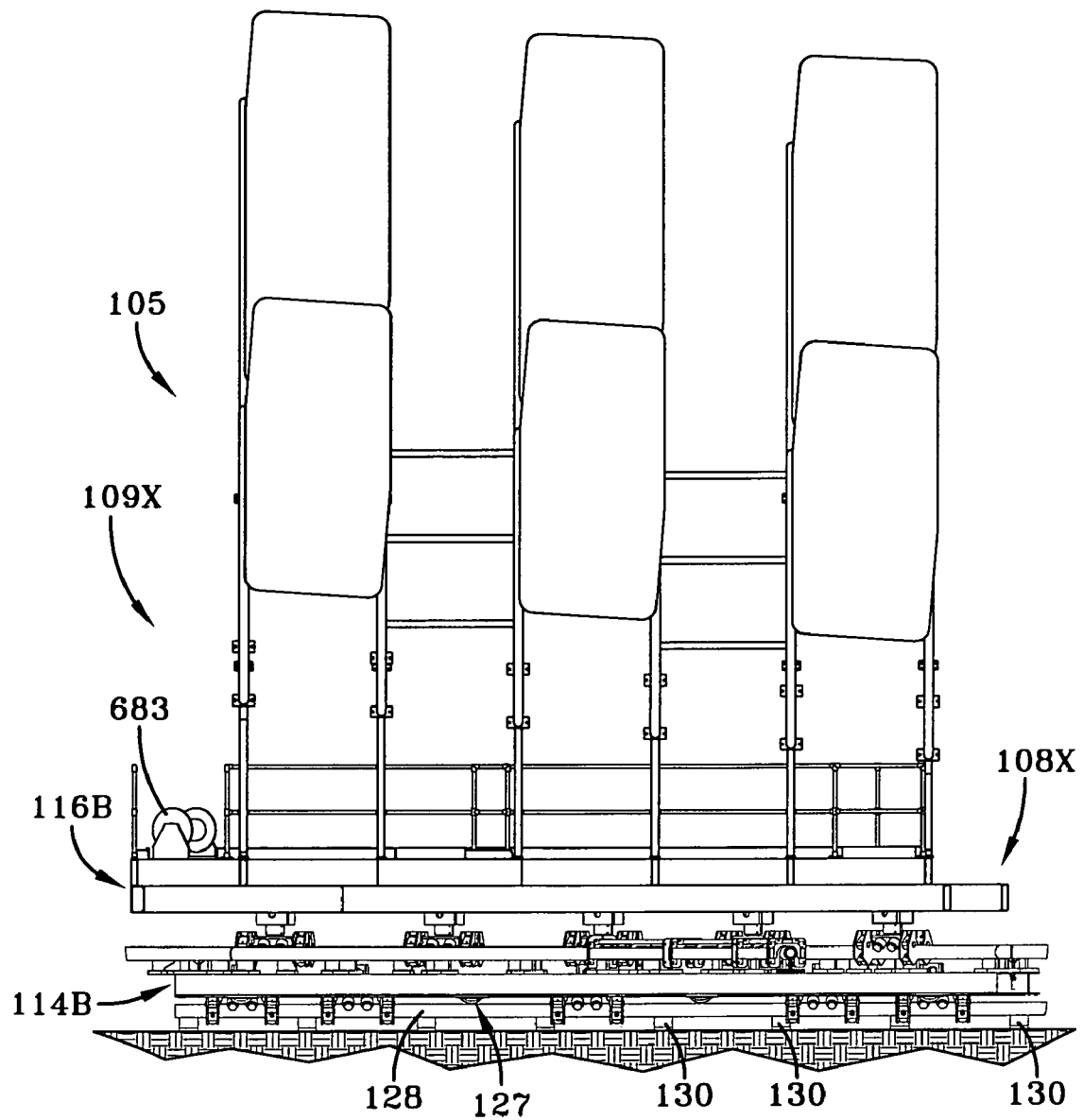
FIG. 5 is an elevational view taken along lines 5-5 of FIG. 2 depicting a forward starboard mooring structure attached to the forward starboard mooring cart, both of which are carried by a forward starboard docking cart.
Figure 6:
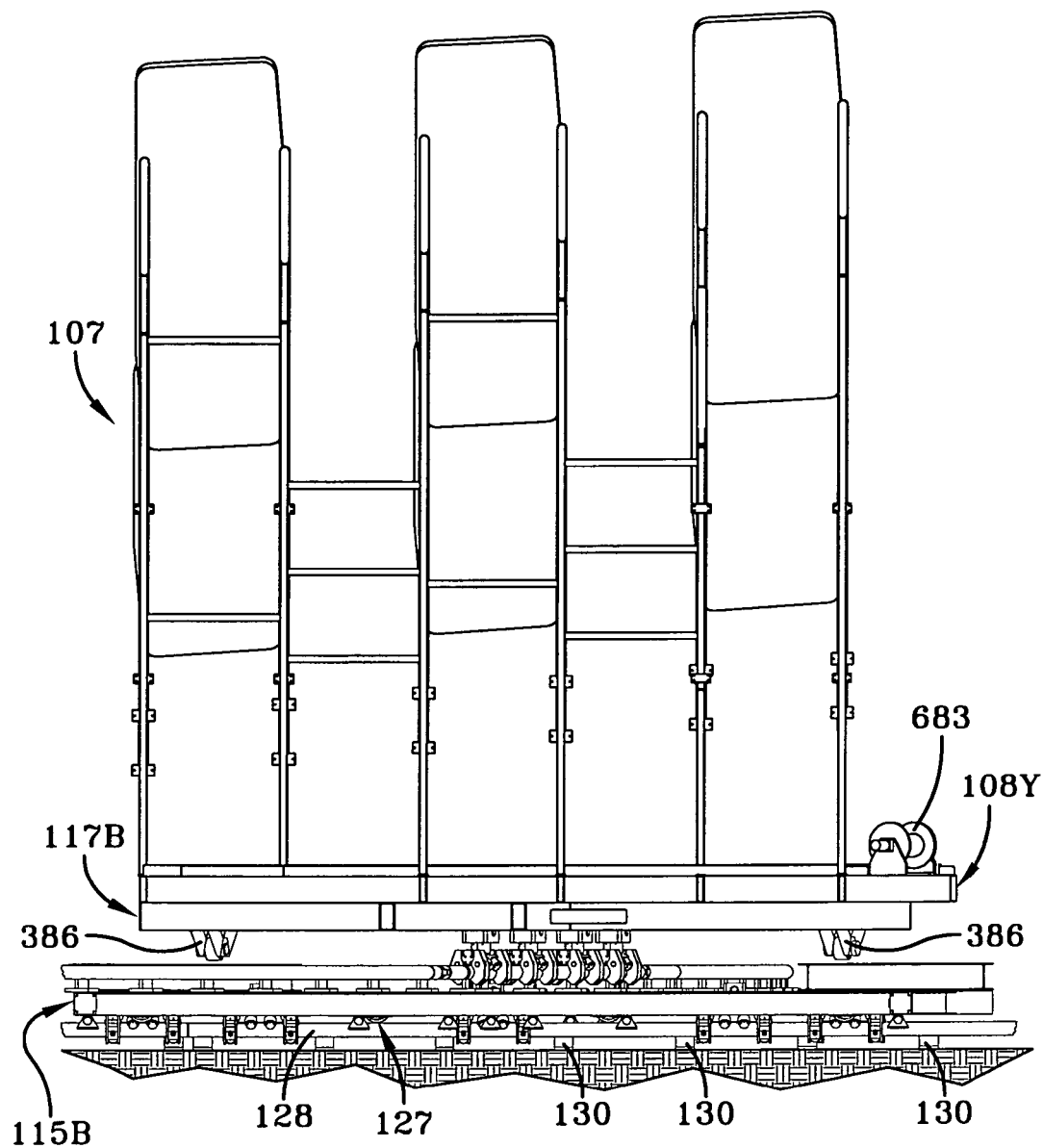
FIG. 6 is an elevational view taken along lines 6-6 of FIG. 2 depicting an aft starboard mooring structure attached to the aft starboard mooring cart, both of which are carried by an aft starboard docking cart.

When the airship is ultimately positioned on the airship docking system 102, a pair of forward port and starboard docking carts 114A and 114B respectively carry a pair of forward port and starboard mooring carts 116A-B as seen in FIG. 5. And a pair of aft port and starboard docking carts 115A and 115B respectively carry a pair of aft port and starboard mooring carts 117A-B as seen in FIG. 6. Specifically, the forward docking carts 114 and aft docking carts 115 are towed so as to transport the respective forward mooring structures 104,105, and aft mooring structures 106,107 along the straight track system 110 between the hangar 101 and weathervane/launching/landing ring R. Furthermore, forward mooring carts 116A-B and aft mooring carts 117A-B transport the forward mooring structures 104 and 105, and aft mooring structures 106 and 107, respectively, along the ring track system 112. On the ring track system 112, the mooring structures 104, 105, 106, and 107 are movable relative to the wind and/or are orientated in a desired manner to prepare for a launch or landing of the airship. It will also be appreciated that the docking carts and mooring carts may be motorized to facilitate movement thereof.

As shown in FIGS. 5 and 6, the forward and aft starboard mooring structures 105 and 107 are attached to the mooring carts 116B and 117B, which respectively ride upon the docking carts 114B and 115B. Similarly, forward and aft port mooring structures 104 and 106 are attached to the mooring carts 116A and 117A, which ride upon the docking carts 114A and 115A.

Figure 7:
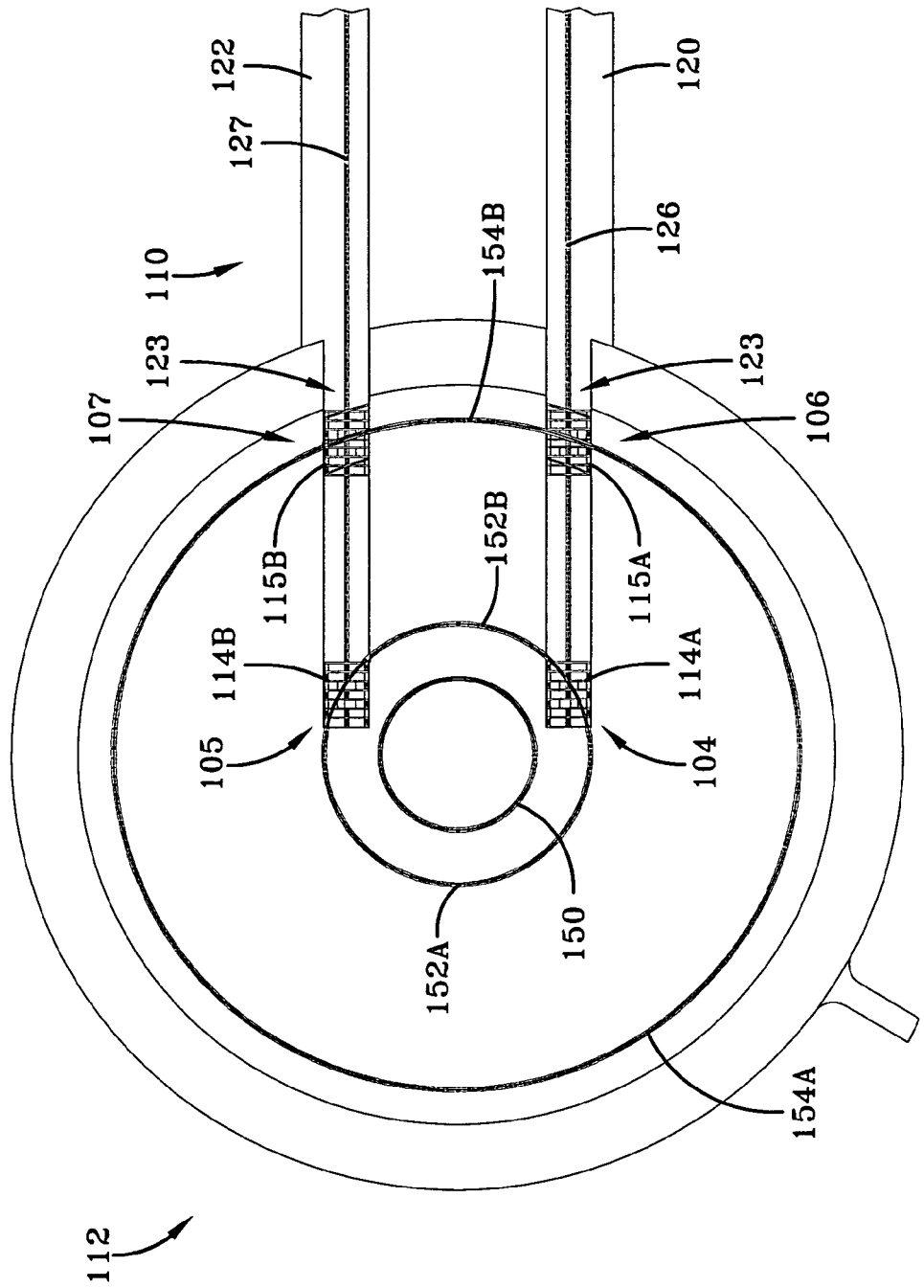
FIG. 7 is a top plan view of a ring track system which carries the docking/mooring carts.
Figure 8:
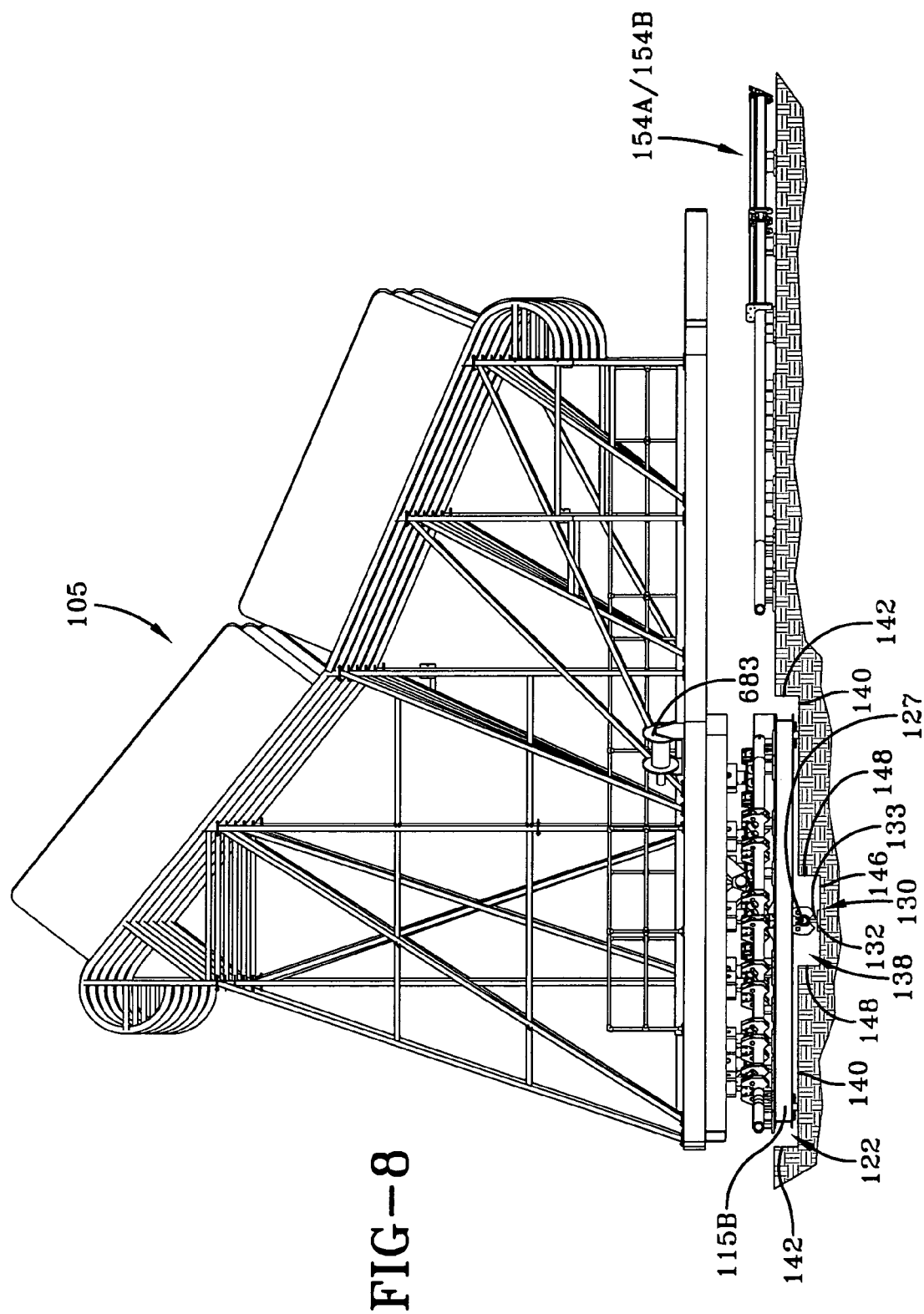
FIG. 8 is an elevational view of the forward starboard mooring structure riding on the forward starboard mooring cart, both of which are carried by the forward starboard docking cart.
Figure 9:
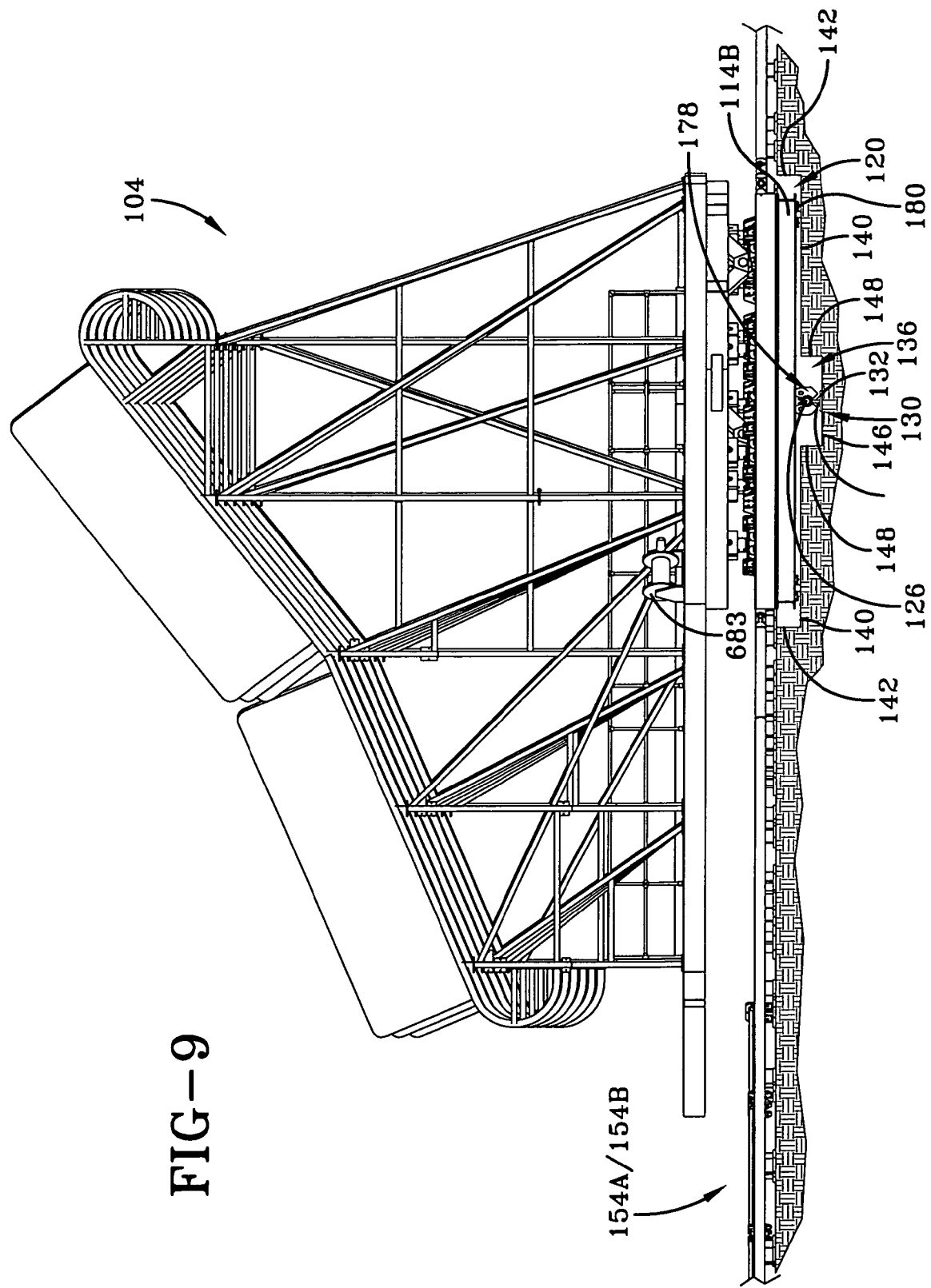
FIG. 9 is an elevational view of the forward port mooring structure riding on the forward port mooring cart, both of which are carried by the forward port docking cart.

As shown in FIG. 7, the straight track system 110 includes a first docking cart channel 120 and a second docking cart channel 122 that are substantially parallel with one another. The first and second docking cart channels 120 and 122 define paths for movement of the docking carts 114 and 115 between the hangar 101 and the weathervane/launching/landing ring R. Indeed, each channel 120 and 122 provides a respective rail 126 and 127, which extends from the interior of the hanger to the ring R. And it will be appreciated that each channel intersects with the ring track system so as to form a ring track gap 123. The forward port docking cart 114A and aft port docking cart 115A move within the first docking cart channel 120 on the rail 126, and the forward starboard docking cart 114B and aft starboard docking cart 115B move within the second docking cart channel 122 on the rail 127, as shown in FIGS. 7, 8, and 9. The docking carts 114 and 115 are provided with rail sections capable of completing the ring track system 112. In other words, when the docking carts 114 and 115 are properly positioned within the first and second docking cart channels 120 and 122, the rail sections provided on the docking carts 114 and 115 fill the gaps 123 in the ring track system 112. As a result, the mooring structures 104, 105, 106, and 107 can then be moved about the ring track system 112 in a manner to be discussed more fully later.

To summarize, the mooring carts 116 and 117 revolve around the ring track system 112, to be positioned as desired. In other words, the mooring carts 116 and 117 and the mooring structures 104-107 attached thereto are capable of moving in unison about the center of the ring track system 112. In doing so, the airship docking system 102 can be properly positioned relative to the wind and/or oriented as desired to launch or capture the airship.

As shown in FIGS. 1A, 1B, and 1C, the hangar 101 includes doors 124 and 125 that are capable of being opened and closed to facilitate the storage of the pressurized airship. The doors 124 and 125 move on hangar tracks 128 and the straight track system 110 crosses these hangar tracks. The tracks 128 and the rails 126,127 cross in such a manner so as to allow operational movement of the doors 125 and 125, and movement of the mooring structures 104-107 without impediment from intersection of the tracks.

The straight track system 110, as shown in FIG. 7, includes a first rail 126 and a second rail 127 which are substantially parallel to one another, and are disposed within respective first and second docking cart channels 120 and 122. The first and second rails 126 and 127, as shown in FIGS. 7, 8 and 9, comprise cylindrical tubes that are supported at various intervals by brackets 130. The brackets 130 are T-shaped, and each include a base section 132 with a leg section 133 extending outwardly therefrom. The leg sections 133 are welded to the cylindrical tubes, and the base sections 132 on either side of the leg sections 133 are supported inside and secured to a first rail channel 136 and a second rail channel 138 that are disposed within the first and second docking cart channels 120 and 122, respectively. The first and second rail channels 136 and 138 provide space for accommodating the first and second rails 126,127 on which the docking carts 114 and 115 ride.

As best seen in FIGS. 8 and 9, the first and second docking cart channels 120 and 122 are sized to accommodate and/or movably receive the docking carts 114 and 115, and each includes horizontal bottom surfaces 140 and vertical sidewalls 142. The first and second rail channels 136 and 138 extend inwardly from the horizontal bottom surfaces 140 along the length of the first and second docking cart channels 120 and 122, and include recessed horizontal bottom surfaces 146 from which extend vertical sidewalls 148. In other words, the vertical sidewalls 148 extend inwardly from the bottom surface 140. The brackets 130 are securely attached to the horizontal bottom surfaces 146, and the vertical sidewalls 148 ensure that the upper extremity of the first and second rails 126 and 127 are at, or are slightly below, the level of the horizontal bottom surfaces 140 of the docking cart channels 120 and 122.

The first and second docking cart channels 120 and 122 extend into the ring track system 112 thereby separating portions of the ring track system 112, into stationary sections separated by gaps 123 which can be completed using the rail sections provided on the docking carts 114 and 115 to be discussed. As shown in FIGS. 1A, 1B, 1C, 2, and most clearly in FIG. 7, the ring track system 112 includes a first inner annular rail 150, a second inner annular rail 152, and an outer annular rail 154. The first and second inner annular rails 150,152, and the outer annular rail 154 are substantially concentric with one another. Moreover, the first inner annular rail 150 is positioned within the second inner annular rail 152, and both the first inner annular rail 150 and second inner annular rail 152 are positioned within the outer annular rail 154. As discussed above, the first and second docking cart channels 120 and 122 break portions of the ring track system 112 into separate sections. Specifically, the gaps 123 formed by the first and second docking cart channels 120 and 122 break the second inner annular rail 152 into a first section 152A and a second section 152B, while the outer annular rail 154 is broken into a first section 154A and a second section 154B. Accordingly, as shown in FIG. 7, the gaps in the second inner rail 152 and in the outer rail 154 of the ring track system 112 are filled, or completed by various rail sections provided by the docking carts 114 and 115. Once the second inner rail 152 and outer rail 154 are completed, the mooring carts 116 and 117 that ride upon the various rail sections provided by the docking carts 114 and 115 respectively, may be moved about the ring track system 112 as desired.

Figure 10:
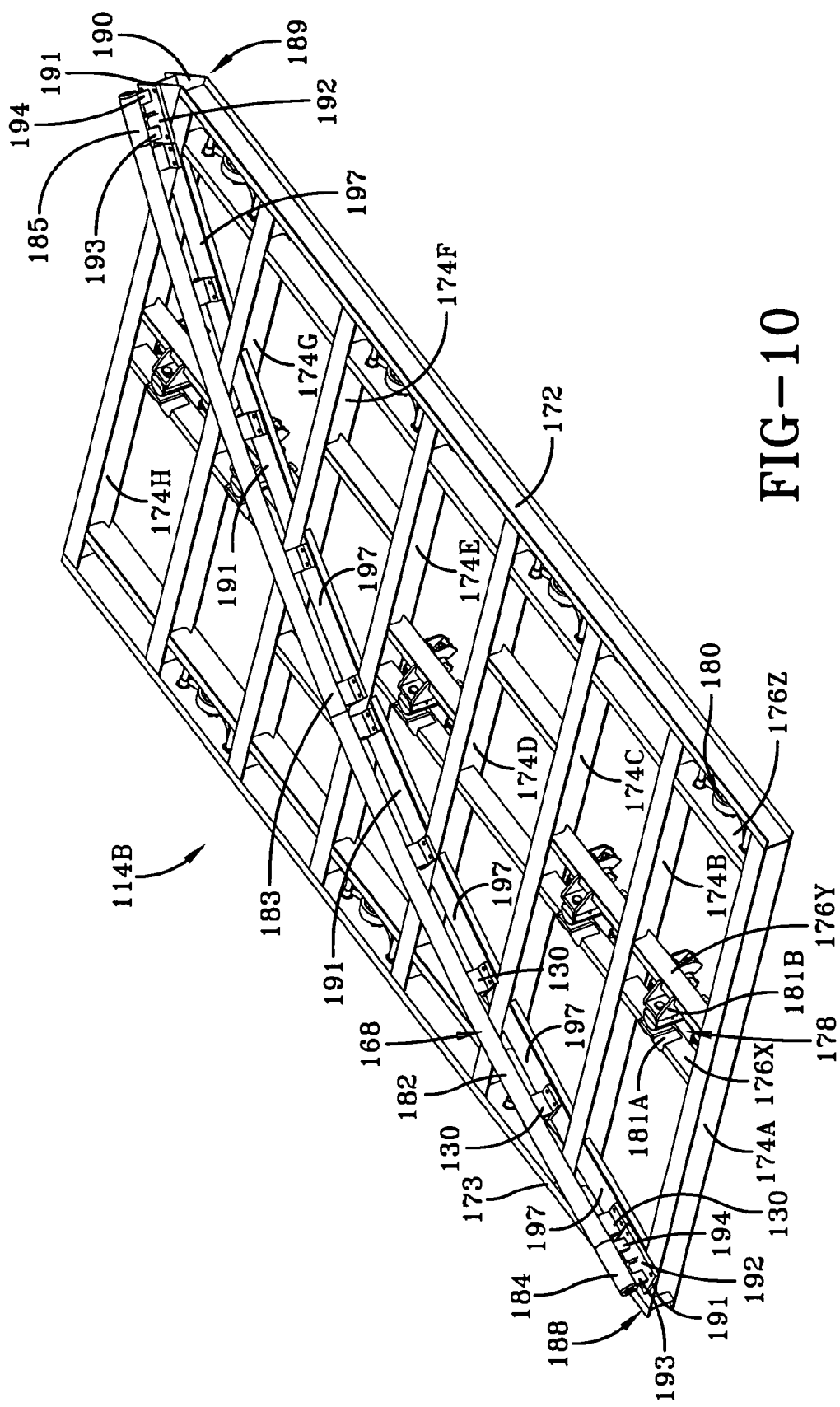
FIG. 10 is a perspective view of the forward starboard docking cart.

Because the forward port and starboard docking carts 114A,114B are mirror images of each other, only the forward starboard docking cart 114B will be described in detail. As shown in FIG. 10, the forward starboard docking cart 114B is substantially rectangular in shape, and is sized to accommodate an arc-shaped rail section 168 used in completing the second inner annular rail 152 of the ring track system 112 (shown in FIG. 7). The forward docking cart 114B is positioned and received within the second docking cart channel 122 to carry the forward starboard mooring cart 116B and the forward starboard mooring structure 105 attached thereto.

The forward docking cart 114B includes substantially parallel beams 172 and 173, and various cross members 174. The various cross members 174 are arranged in a ladder-type configuration. That is, the various cross members 174 are arranged substantially parallel with respect to one another, and substantially perpendicularly oriented with respect to and connected to the parallel beams 172 and 173. As such, the various cross members 174 (denoted with the suffixes A through H) are arranged like rungs of a ladder spaced apart between the parallel beams 172 and 173. In particular, cross members 174A and 174H are spaced apart at opposite ends of the forward docking cart 114B, and together with the parallel beams 172 and 173 define the exterior perimeter of the forward docking cart 114B.

Interspersed between the various cross members 174 are various strut members 176. The various strut members 176 are used to reinforce the forward docking cart 114B by maintaining the spacing of the cross members 174, and are used as attachment points for a number of bogie wheel assemblies 178 and outrigger wheel assemblies 180.

Generally, the bogie wheel assemblies 178 are provided to slidably interconnect the docking cart 114B and attached mooring cart 116B with the straight track system 100. The outrigger wheel assemblies 180, on the other hand, are provided on the docking carts 114B to provide rolling support and to prevent unwanted tipping thereof. More specifically, the bogie wheel assemblies 178 attached to the forward docking cart 114B allow the docking cart 114B to move along the second rail 127 of the straight system 110. Furthermore, the outrigger wheel assemblies 180 attached to the forward docking cart 114B roll upon the horizontal surface 140 of the second docking cart channel 122.

Continuing with FIG. 10, three (3) strut members 176 (denoted with the suffixes X, Y, and Z) are positioned between the cross members 174A and 174B at one end of the forward docking cart 114B. The strut members 176X and 176Y are paired with one another to support a pair of opposing L-shaped mounting brackets 181A and 181B to which one of the bogie wheel assemblies 178 is attached therebetween. Furthermore, strut member 176Z is positioned adjacent parallel beam 172 to support one of the outrigger wheel assemblies 180. In similar fashion, other bogie wheel assemblies 178 are supported by pairs of strut members 176 arranged between the various cross members 174 along about the center of the forward docking cart 114B, and other outrigger wheel assemblies 180 are supported by strut members 176 positioned adjacent to both of the parallel beams 172 and 173.

As discussed above, the forward docking cart 114B supports the arc-shaped rail section 168, which may be a single piece or which may be segmented into a pair of rail segments 182 and 183 that extend between a first and second end rail segment 184 and 185. The first and second end rail segments 184 and 185 are sized somewhat smaller than the rail segments 182 and 183, and are positioned at two (2) opposite corners of the forward docking cart 114B. As shown in FIG. 10, the first and second end rail segments 184 and 185 are positioned at a forward starboard corner 188 and at an aft port corner 189 of the forward docking cart 114B. To that end, the first end rail segment 184 is attached to the cross member 174A, and the second end rail segment 185 is, in part, attached to the cross member 174H on the forward docking cart 114B. The second end rail segment 185 is also attached to an extension bracket 190 attached to the forward docking cart 114B adjacent the aft port corner 189.

The first and second end rail segments 184 and 185 are attached to the forward docking cart 114B using brackets 191 which are similar to brackets 130 but are longer. As such, each of the brackets 191 includes a base section 192 with a first leg 193 and a second leg 194 extending outwardly therefrom, which connect the cylindrical end rail segments 184,185 to the base section 192.

Like the end rail segments 184 and 185, rail segments 182 and 183 are attached to and supported by at least one of the cross members 174. However, the rail segments 182 and 183 are primarily supported by extension beams 197 extending between adjacent cross members 174. Moreover, the extension beams 197 are collectively arranged to form an arc conforming to the curvilinear shape of the arc-shaped rail section 168. The rail segments 182 and 183 are attached to the forward docking cart 114B using brackets 130 previously discussed that are attached to either the cross members 174 or the extension beams 197.

Figure 11:
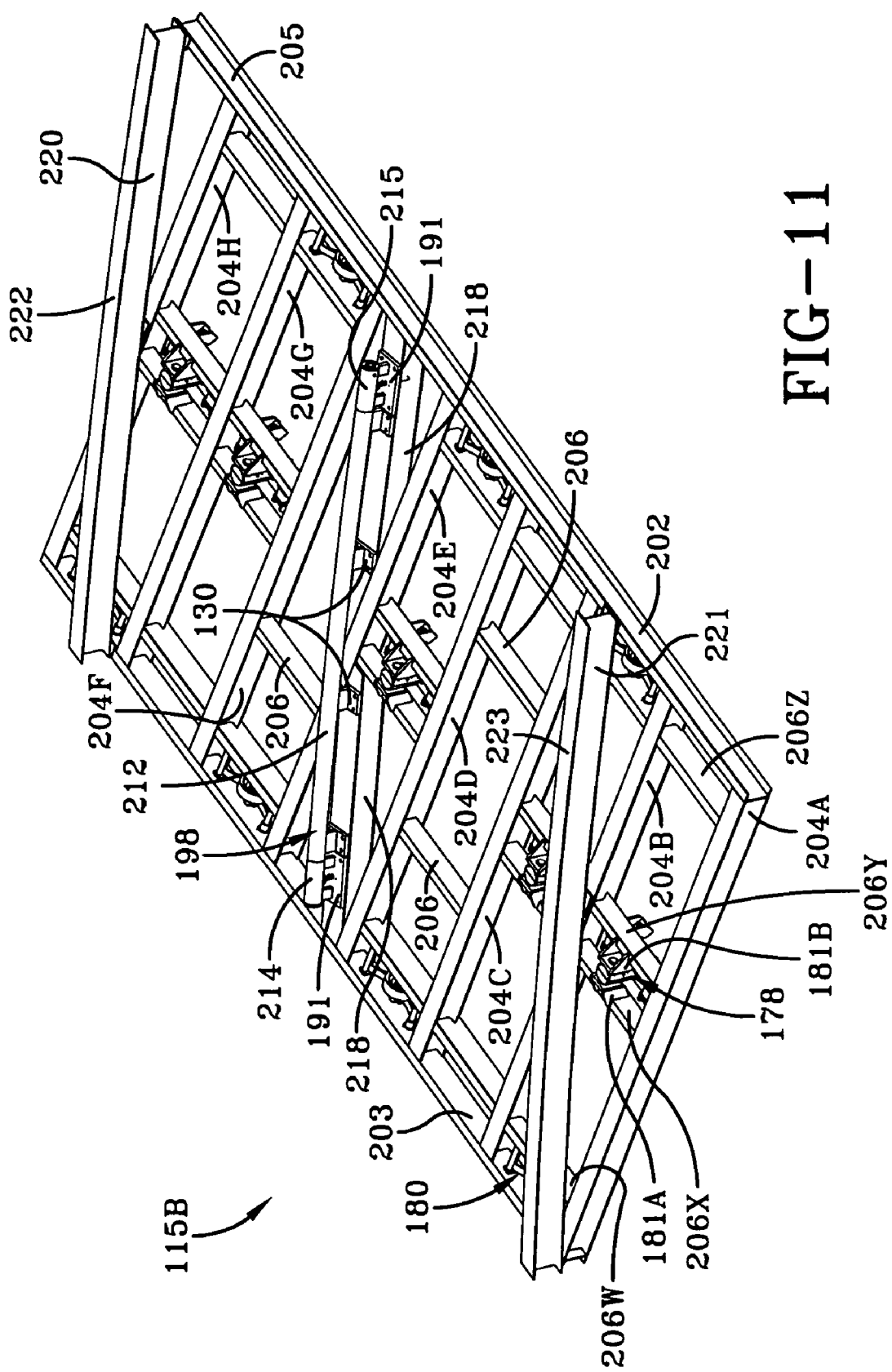
FIG. 11 is a perspective view of the aft starboard docking cart.

Since the aft port and starboard docking carts 115A and 115B are mirror images of each other, and thus substantially the same, only the aft starboard docking cart 115B will be described in detail. As shown in FIG. 11, the starboard aft docking cart 115B is substantially rectangular in shape, and as discussed below, is sized to accommodate an arc-shaped rail section 198 used in completing the outer annular rail 154 of the ring track system 112. The aft docking cart 115B is positioned and received within the second docking cart channel 122 to carry the mooring cart 117B and the mooring structure 107 attached thereto.

The aft docking cart 115B includes substantially parallel beams 202 and 203 that are connected to one another by various cross members 204 (denoted with suffixes A through H). Furthermore, the various cross members 204 of the aft docking cart 115B are arranged in a ladder-type configuration. That is, like rungs of a ladder, the various cross members 204 (denoted with the suffixes A through H) are substantially arranged in parallel with respect to one another, and are substantially perpendicularly oriented with respect to the parallel beams 202 and 203. The parallel beam 202 provides an extension portion 205 that extends beyond the cross-member 204H to support various rails to be discussed.

Interspersed between the various cross members 204 are various strut members 206. The strut members 206 are used to reinforce the aft docking cart 115B by maintaining the spacing of the cross members 204, and are used as attachment points for the bogie wheel assemblies 178 and the outrigger wheel assemblies 180. As shown in FIG. 11, four (4) strut members 206 (denoted with the suffixes W, X, Y, and Z) are positioned between the cross members 204A and 204B at one end of the aft docking cart 115B. The strut member 206W is adjacent parallel beam 203 to support one of the outrigger wheel assemblies 180, and strut members 206X and 206Y are paired with one another to support the pair of L-shaped mounting brackets 181A and 181B to which one of the bogie wheel assemblies 178 is attached therebetween.

As discussed above, the aft docking cart 115B supports the arc-shaped rail section 198 that may be one piece or segmented. Specifically, the arc-shaped rail section 198 includes a rail segment 212 positioned between a first and a second end rail segment 214,215. The first and second end rail segments 214 and 215 are sized to be somewhat smaller than the rail segment 212, and are located at each end of the rail segment 212. The first and second end rail segments 214 and 215, as well as the rail segment 212, are attached to and supported by two (2) extension beams 218 extending between parallel beams 202 and 203 in an arc conforming to the curvature of the outer rail 154 of the ring track system 112. Specifically, one extension beam 218 is disposed between cross members 204D and 204E, and the other extension beam 218 is disposed between cross members 204E and 204F. Moreover, the rail segment 212 is attached to the aft starboard docking cart 115B via the cross members 204 or extension beams 218 along the arc defined by the extension beams 218 via various brackets 130 as discussed above with respect to the forward docking cart 114B. Furthermore, the first and second end rail segments 214 and 215 are attached to the aft docking cart 115B using brackets 191 in a manner previously discussed with respect to the forward docking cart 114B.

The extension portion 205 of parallel beam 202 extends beyond cross member 204H. In doing so, the extension portion 205 serves to support a first arc-shaped support beam 220. The first arc-shaped support beam 220 along with a second arc-shaped support beam 221 are used to provide first and second horizontal surfaces 222 and 223, respectively. The first and second horizontal surface 222 and 223 define raceways for accommodating the outrigger wheel assemblies 180 attached to the starboard aft mooring cart 117B carried by the aft docking cart 115B. Indeed, the surfaces 222 and 223 effectively bridge the respective gap formed by the channels 122 and 123.

Figure 12:
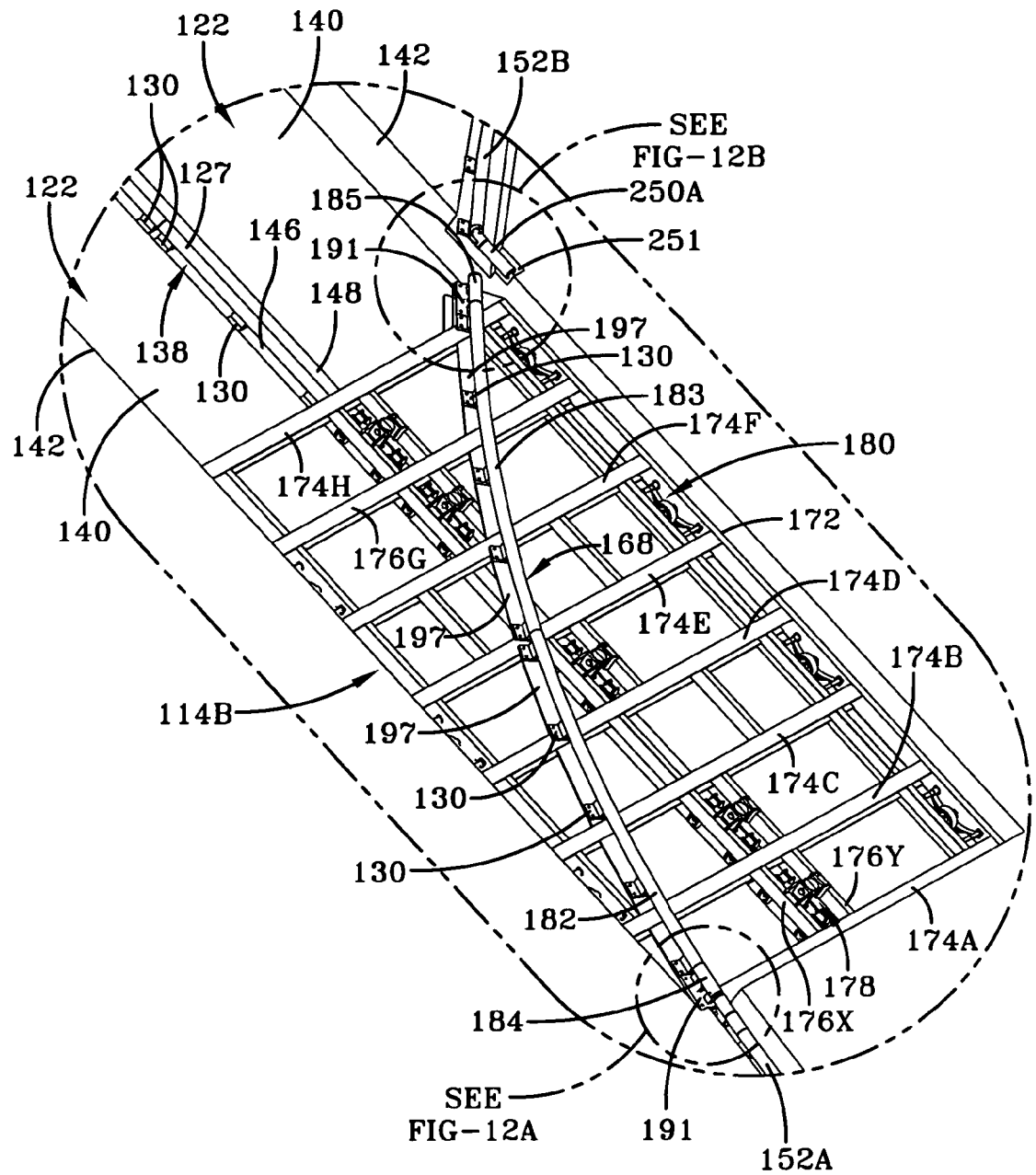
FIG. 12 is a detailed perspective view of the forward starboard docking cart positioned to complete an inner rail of the ring track system.
Figure 12A:
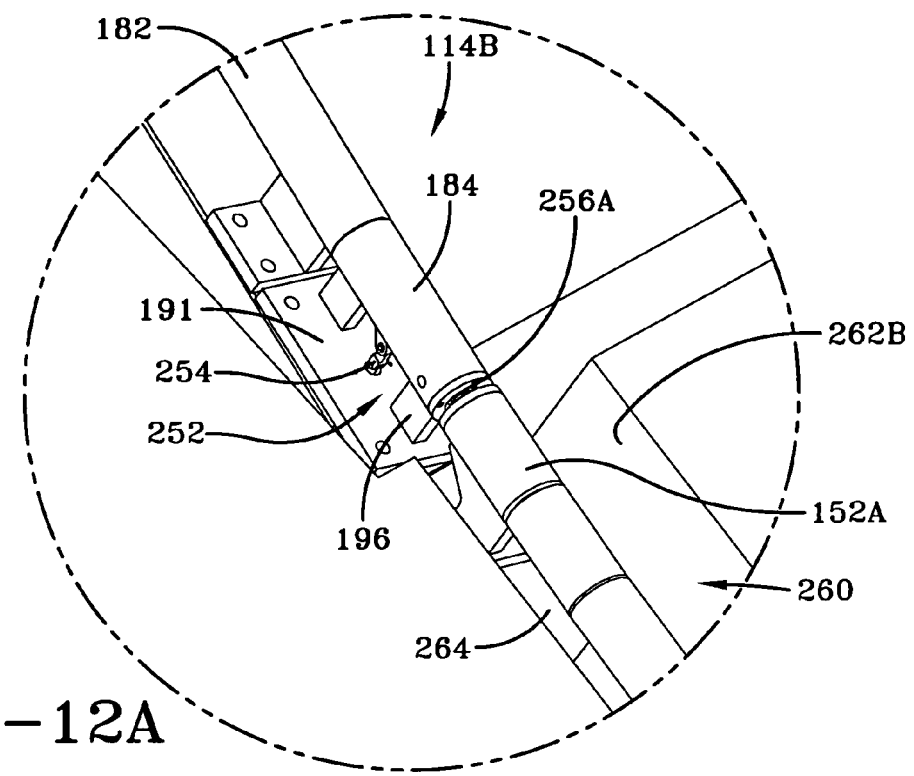
FIG. 12A is a detailed perspective view of a first end rail segment of the forward starboard docking cart.
Figure 12B:
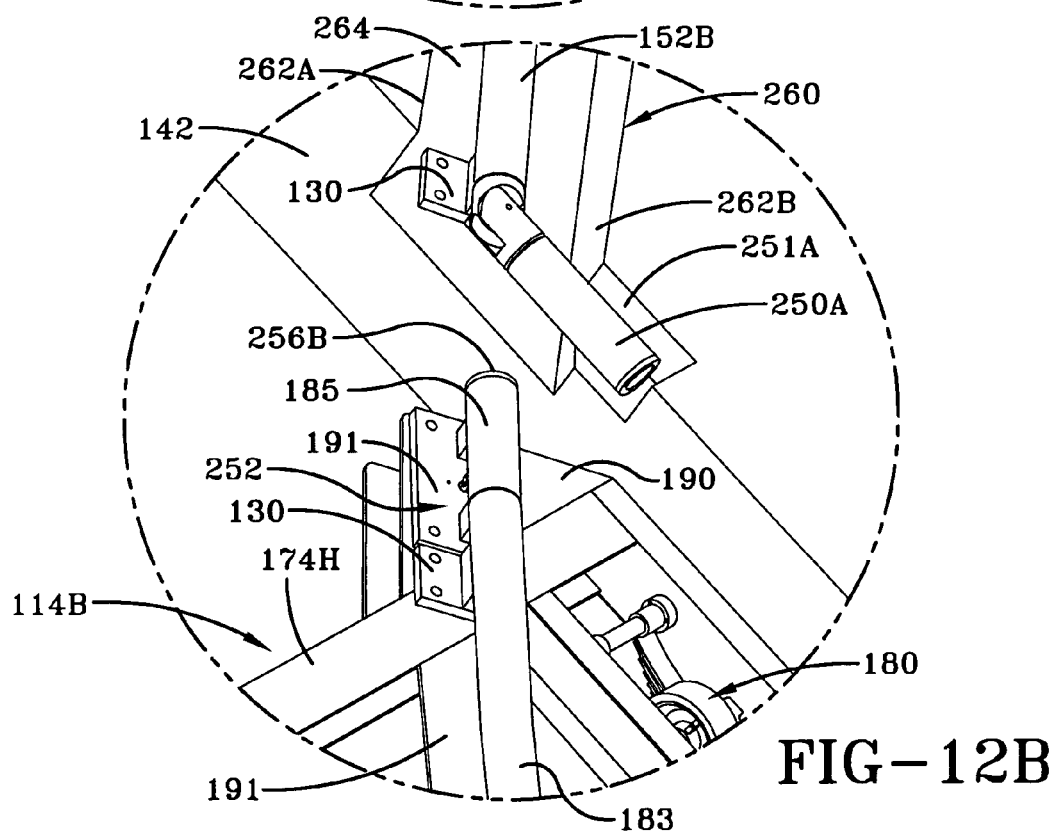
FIG. 12B is a detailed perspective view of a second end rail segment of the forward starboard docking cart.

As shown in FIGS. 12, 12A, and 12B the forward starboard docking cart 114B is disposed within the second docking cart channel 122 of the straight track system 110 and is in engagement with the ring track system 112. Because the movement and operation of the forward starboard and forward port docking carts 114B, 114A are substantially the same, only the forward starboard docking cart 114B will be discussed. The movement of the docking cart 114B is facilitated by the rolling action provided of the bogie wheel assemblies 178 along the second rail 127. Additionally, the outrigger wheel assemblies 180 serve to provide rolling support to the docking cart 114B as it moves. When the airship is brought into position at the weathervane/launching/landing ring R, the forward docking cart 114B is moved along the second rail 127 of the straight track system 110 until the arc-shaped rail section 168 is aligned with the second inner rail 152 of the ring track system 112. Once the arc-shaped rail section 168 is aligned with the first 152A and second 152B sections of the of the inner rail 152, a pivoting rail section 250A is actuated to complete, or otherwise connect, the first and second sections 152A and 152B of the second inner rail 152 with the arc-shaped rail section 168. When not in use, the pivoting rail section 250A is moved out of the way into a rail recess 251A.

As shown in FIGS. 12A and 12B, upon engagement with second inner rail 152, a locking pin system 252 comprising a lever assembly 254, which is housed within the first and second end rail segments 184 and 185 of the forward starboard docking cart 114B, actuates a pin (not shown) causing it to protrude outward from rail segment apertures 256A and 256B. The pin is received by a complementary rail segment aperture (not shown) in the end of the first section 152A, and the pivotal rail section 250A of second rail section 152B of the second inner rail 152. The use of the locking system 252 allows the curved rail section 168 and the second inner rail 152 to be rigidly joined together and provide an uninterrupted track.

FIG. 12B shows the rear portion of the docking cart 114B and that the pivoting rail section 250A is pivotally attached to the end of both first and second sections 152A,152B of the inner rail 152. The pivoting attachment of the pivoting rail section 250A may be achieved by rotation about a pin that is inserted through an end of the pivoting rail section 250A, and end of the first and second inner rail 152A and 152B. Prior to the forward docking cart 114B completing the first and second sections 152A, 152B of the inner rail 152, the pivoting rail section 250A is moved into the recess 251 which is within the vertical surface 142 of the docking cart channel 122. This prevents the pivoting rail section 250A from being struck by the docking cart 114B as the docking cart 114B moves into position at the weathervane/launching/landing ring R. In fact, because of the combination of the pivoting action of the pivoting rail section 250A and the recess 251, any contact imparted from the docking cart 114B to the pivoting rail section 250A results in the pivoting rail section 250A rotating into the rail recess 251. As such, the docking cart 114B and the various rail systems 110,112 are protected from damage.

As best seen in FIGS. 12A and 12B, the second inner rail 152 is disposed within a first mooring cart channel 260 that allows the forward mooring cart 116A to move. The first mooring cart channel 260 circumscribes the region defined by the second inner rail 152. Specifically, the first mooring cart channel 260 includes vertical facing sidewalls 262A and 262B, and a horizontal rail surface 264 between the sidewalls 262 upon which the second inner rail 152 is mounted using brackets 130 as previously discussed. The dimensions of the first mooring cart channel 260 are suited to accommodate the dimension of the bogie wheel assemblies 178 attached to the forward mooring cart 116B, thereby allowing the mooring structure 105 to move about the weathervane/launching/landing ring R in a manner which will be discussed later.

Figure 13:
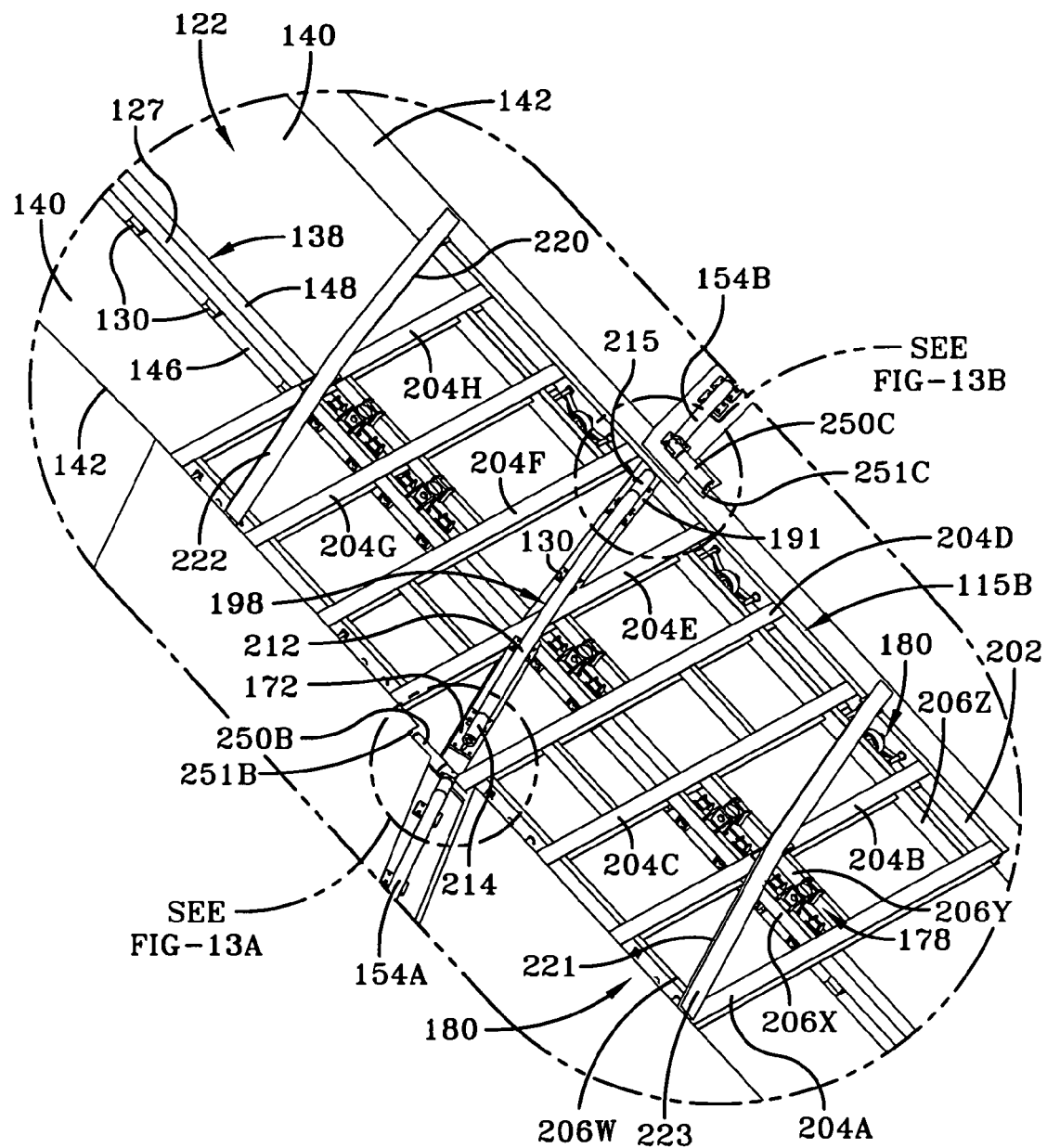
FIG. 13 is a detailed perspective view of the aft starboard docking cart positioned to complete an outer rail of the ring track system.
Figure 13A:
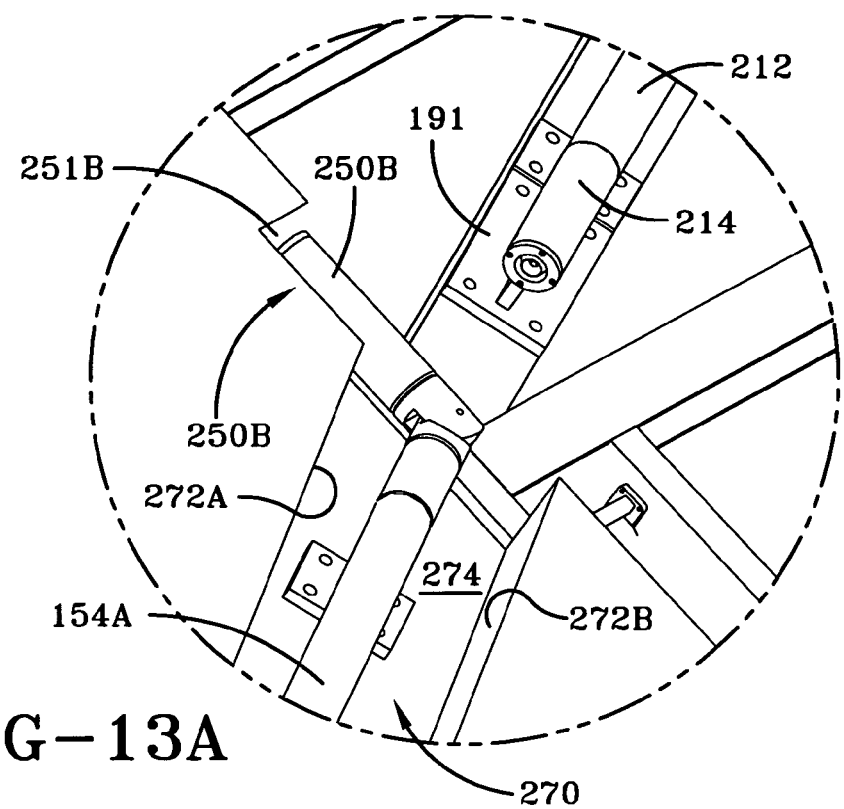
FIG. 13A is a detailed perspective view of a first end rail segment for the aft starboard docking cart.
Figure 13B:
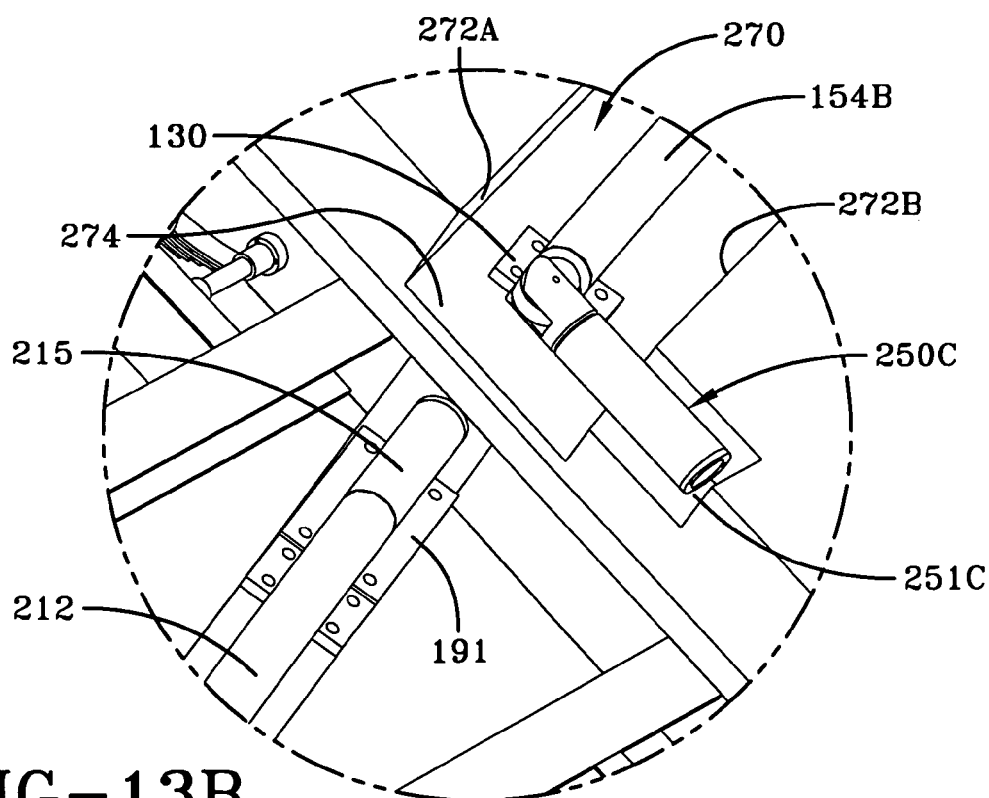
FIG. 13B is a detailed perspective view of a second end rail segment for the aft starboard docking cart.

Referring to FIGS. 13, 13A, and 13B, the aft docking cart 115B is disposed within the second docking cart channel 122 of the straight track system 110. Because the movement of the aft starboard docking cart 115B is substantially the same as the aft port docking cart 115A, only the aft starboard docking cart 115B will be discussed. The movement of the docking cart 115B is facilitated by the movement of the bogie wheel assemblies 178 along the second rail 127. Additionally, the outrigger wheel assemblies 180 serve to provide rolling support to the aft docking cart 115B as it moves. When the airship is brought into position at the weathervane/launching/landing ring R, the aft docking cart 115B is moved along the second rail 127 of the straight track system 110 until the arc-shaped rail section 198 is aligned with the outer annular rail 154 of the ring track system 112. Specifically, when the arc-shaped rail section 198 is aligned with first 154A and second 154B sections of the outer annular rail 154, a pair of pivoting rail sections 250B and 250C are activated so to complete the outer annular rail 154.

As shown in FIGS. 13A and 13B, pivoting rail sections 250B and 250C are pivotally attached to the end of respective first and second sections 154A,154B of the outer rail 154 that are separated by the second docking cart 122. The pivoting rail sections 250B and 250C pivot about a pin (not shown). Prior to the forward docking cart 115B completing the first and second sections 154A, 154B of the outer rail 152, the pivoting rail section 250B and 250C are retracted into rail recesses 251B and 251C disposed within the vertical surface 142 of the second docking cart channel 122. This prevents the pivoting rail sections 250B and 250C from being struck by the aft starboard docking cart 115B as it moves into position at outer rail 154.

Once the aft starboard docking cart 115B has completed the outer rail 154, the aft mooring cart 117 is able to move about the outer rail 154 that is disposed within a second mooring cart channel 270. The second mooring cart channel 270 includes vertical sidewalls 272A and 272B which are connected by a recessed horizontal rail surface 274 upon which the outer rail 154 is mounted using brackets 130 as previously discussed.

It should also be appreciated that the locking pin system 252 discussed with respect to the forward docking cart 114B, in FIG. 12 may also be utilized within the first and second rail ends 214, 215 of the aft docking cart 115B, to allow the protruding pin to be received within the pivoting rail sections 250B and 250C of the outer rail 154. As such, the locking pin system 252 allows the outer rail 154 and the arc-shaped section 198 of the aft docking cart 115B to be rigidly coupled to support the movement of the various aft mooring structures 106,107 thereupon.

Figure 14:
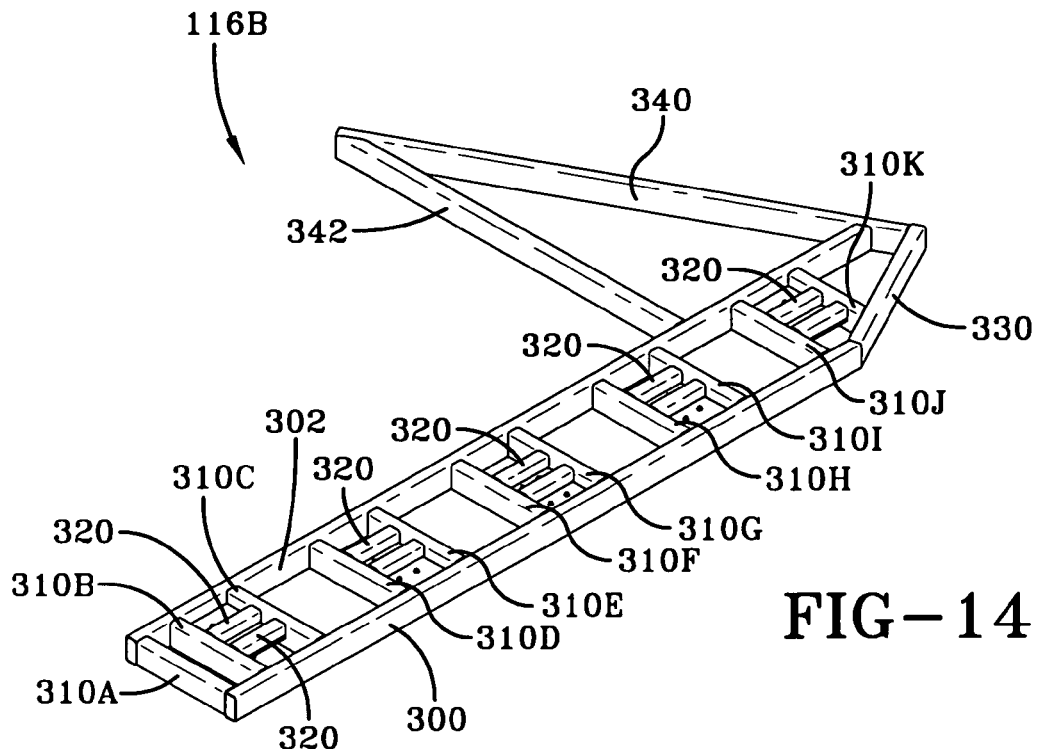
FIG. 14 is a top perspective view of the forward starboard mooring cart.
Figure 14A:
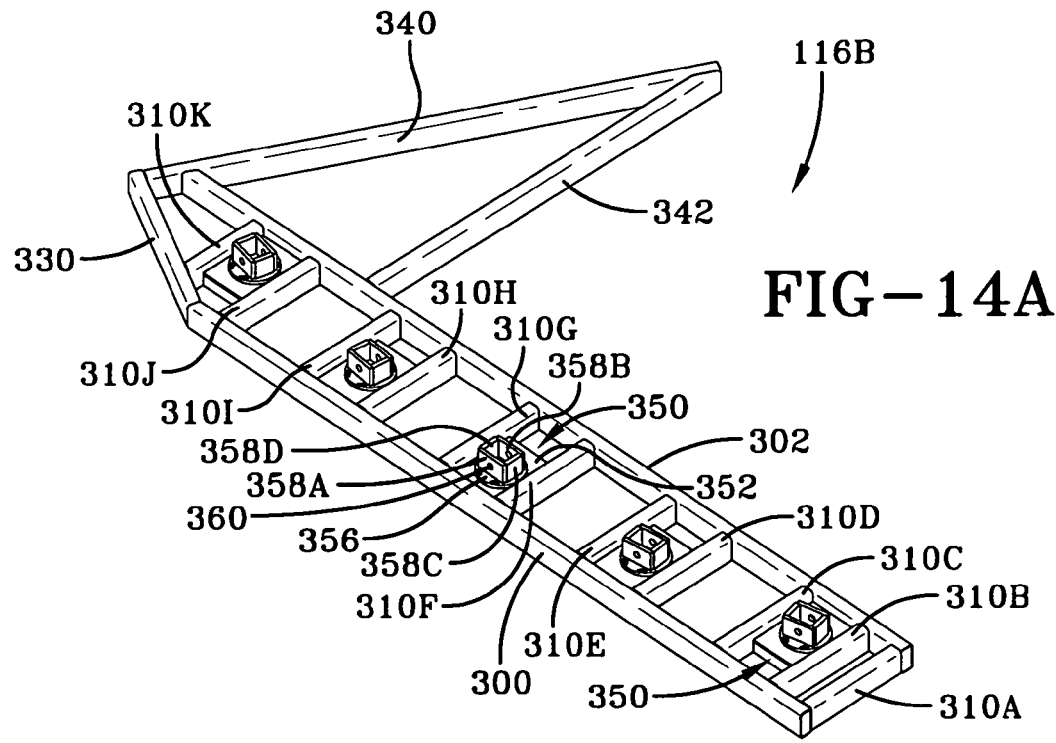
FIG. 14A is a bottom perspective view of the forward starboard mooring cart.

Forward mooring structures 104 and 105 are coupled to forward mooring carts 116B as a part of the ground handling system 100. Because forward and aft starboard mooring carts 116B,117B are substantially the same as the forward and aft port mooring carts 116A,117A, only the forward and aft starboard mooring carts 116B,117B will be discussed below. The forward starboard mooring cart 116B is used to support the mooring structure 105, allowing it to move about the ring track system 112 when the forward docking cart 116B has completed the second inner rail 152. Specifically, as seen in FIGS. 14 and 14A, the forward starboard mooring cart 116B comprises first and second substantially parallel beams 300, 302. The parallel beams 300,302 are separated by cross members 310A-K, whereby cross members 310B and 310C are proximate to cross member 310A. Cross member pairs 310B, 310C; 310D,310E; 310F,310G; 310H,310I; and 310J,310K are connected by struts 320 to provide structural integrity to the cart. Extending from the end of the first parallel beam 300 is a beam extension 330. A first angled rail 340 is angularly attached to the beam extension 330. Second parallel beam 302 also attaches to the first angled rail 340 to provide additional rigidity. A second angled rail 342 extends substantially perpendicularly outward from the second parallel beam 302, whereby it attaches to the end of the first angled rail 340 to create a substantially triangular structure.

As shown in FIG. 14A, the second side of the mooring cart 116 includes a plurality of bogie wheel attachment assemblies 350 that are disposed between each pair of cross members 310B,310C; 310D,310E; 310F,310G; 310H,310I; and 310J,310K. The bogie wheel attachment assemblies 350 comprise a platform 352 that fits within the openings defined by parallel beams 300, 302 and the cross member pairs 310B, 310C; 310D,310E; 310F,310G; 310H,310I; 310J,310K. Attached to each platform 352 is a base 356 and four (4) bracket members 358A, 358B, 358C, 358D that extend perpendicularly outward therefrom. To enable attachment of the bogie wheel assemblies 178, opposing bracket members 358A and 358B each include an aperture 360. Furthermore, in order to accommodate the curvature of the curved rail segment 168 of the forward docking cart 114B and the second inner rail 152, the bogie wheel attachment assemblies 350 attached between cross member pairs 310D,310E; 310F, 310G; 310H,310I; and 310J,310K are positioned in close proximity to or adjacent first parallel beam 300. Whereas bogie wheel attachment assemblies 350 attached between cross member pairs 310B,310C and 310J,310K are positioned in close proximity to or adjacent the second parallel beam 302. In other words, the attachment assemblies 350 are selectively positioned between the beams 300,302 to enable movement of the cart on the appropriate rail. As such, the mooring cart 116B is able to move about the second inner rail 152.

Figure 15:
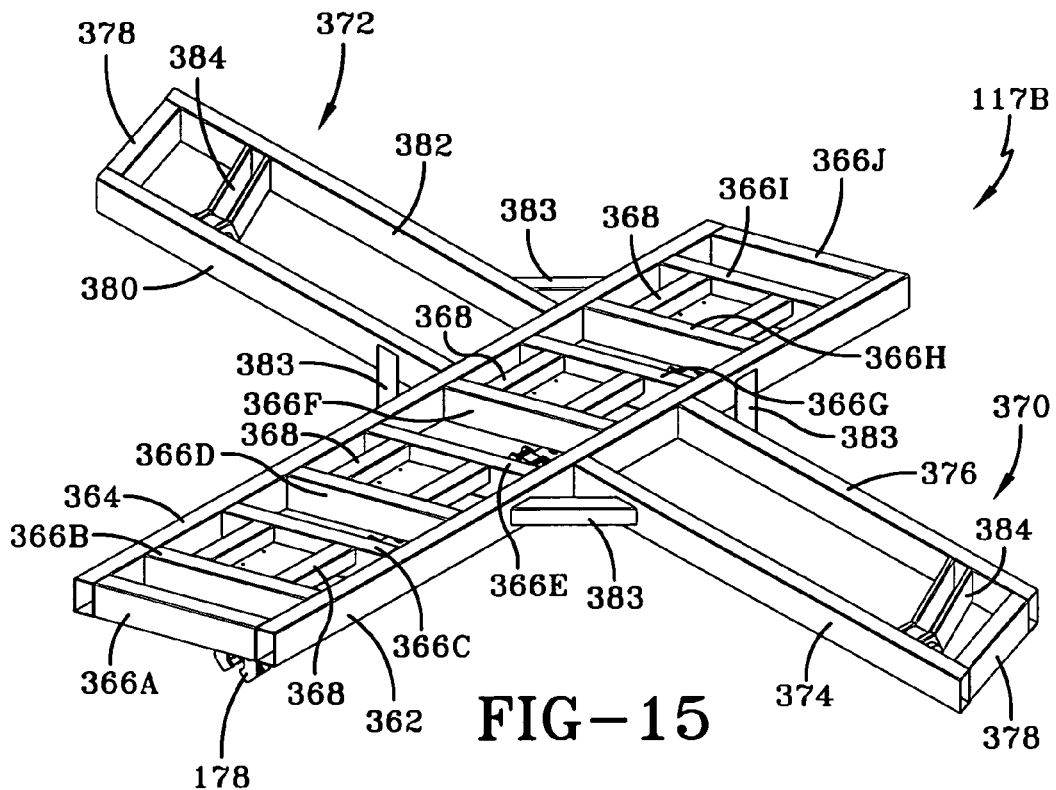
FIG. 15 is a top perspective view of the aft starboard mooring cart.
Figure 15A:
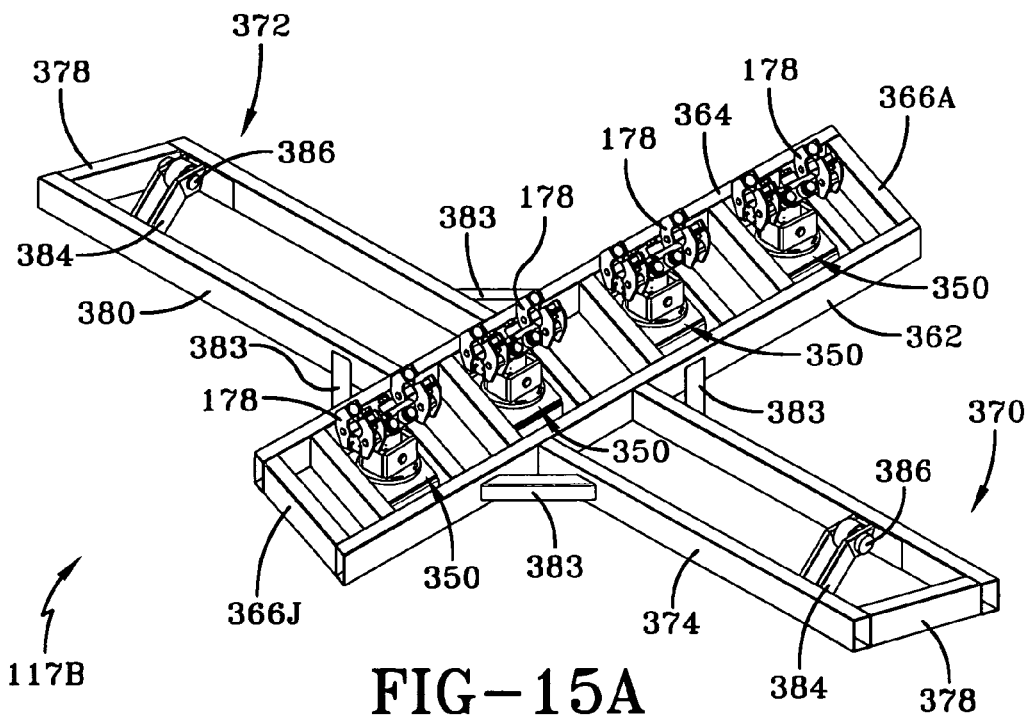
FIG. 15A is a bottom perspective view of the aft starboard mooring cart.

The starboard aft mooring cart 117B, shown in FIGS. 15 and 15A, assists in moving the starboard aft mooring structure 107 about the outer rail 154, and functions in much the same manner as the forward mooring cart 116B discussed with respect to FIGS. 14 and 14A. Specifically, the aft mooring cart 117B comprises first and second substantially parallel beams 362,364. The parallel beams 362,364 are separated by and connected to cross members 366A-J, whereby cross members 366B and 366I are proximate to respective cross members 366A and 366J. Cross member pairs 366B,366C; 366D,366E; 366F,366G; 366H,366I are connected by a plurality of struts 368 to enhance the rigidity of the mooring cart 117B. Extending from the first and second parallel beams 362,364 are first and second lateral supports 370,372 respectively. The first lateral support 370 comprises first and second substantially parallel beams 374,376, which are separated by a cross member 378. The second lateral support 372, similarly comprises first and second substantially parallel beams 380, 382 that are also separated by the cross member 378. Furthermore, a plurality of braces 383 are interspersed between the first and second lateral supports 370,372 and the first and second beams 362,364 to further add to the stability thereof.

As shown clearly in FIG. 15A, interposed between the first and second parallel beams 374,376; 380,382 of the first and second lateral supports 370,372 are supplemental wheel supports 384. The supplemental wheel supports 384 are configured to carry stabilizing outrigger wheel assemblies 386 that ride on the raceways 222,223 of the aft docking cart 115B, thus providing rolling stability as the mooring cart 117B moves about the ring track system 112. The stabilizing outrigger wheel assemblies 386 may comprise any suitable rotatably mounted wheel capable of supporting the load of the aft mooing structure 107, and airship. In addition, the bogie wheel attachment assemblies 350 discussed with respect to the forward mooring cart 116B are disposed and appropriately positioned between each pair of cross member pairs 366B,366C; 366D,366E; 366F,366G; and 366H,366I. As previously discussed the bogie wheel attachment assemblies 350 serve as an attachment point for the bogie wheel assemblies 178 that allow the aft mooring cart 117B to move about the outer rail 154 of the ring track system 112.

Figure 16:
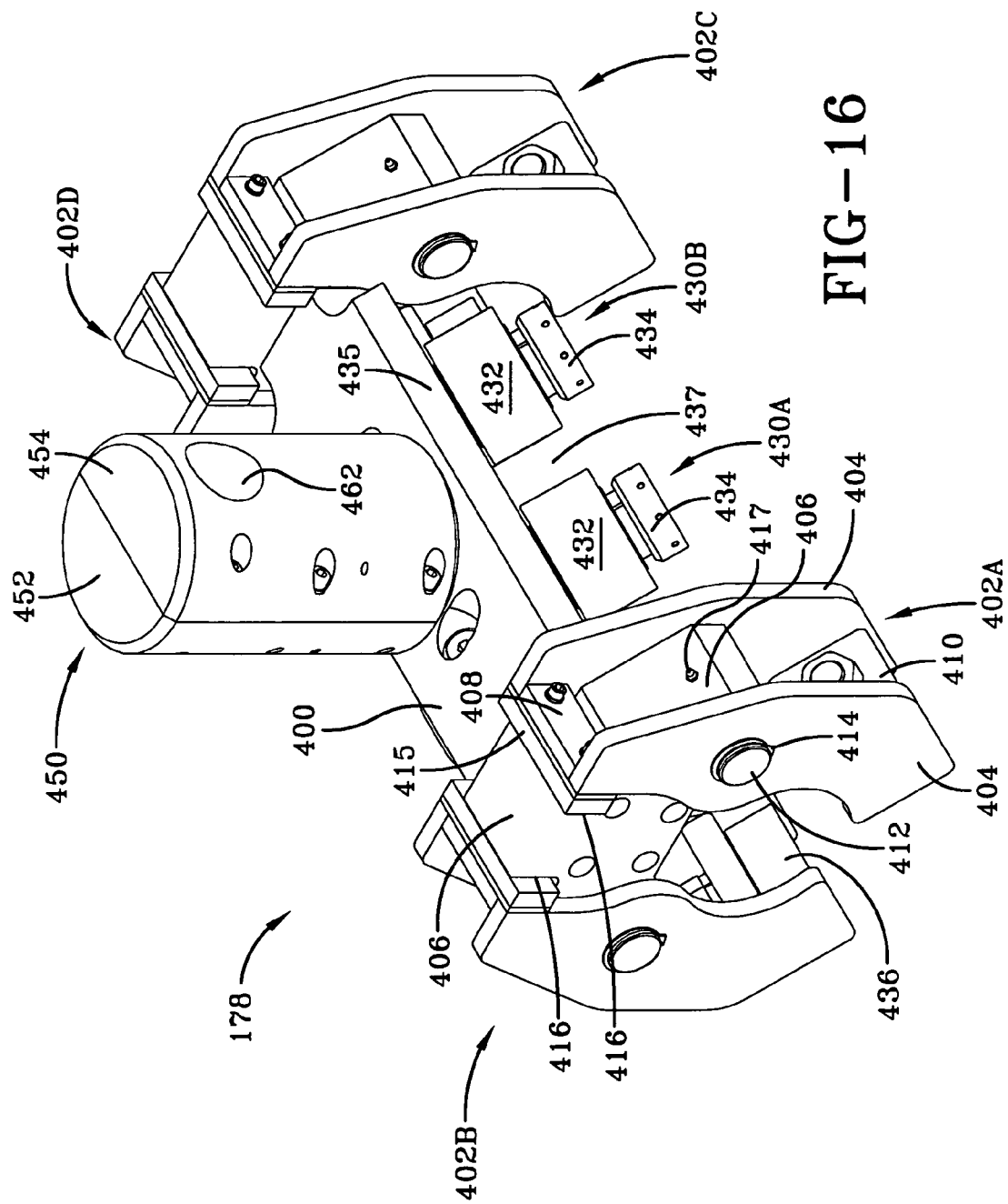
FIG. 16 is a perspective view of a bogie wheel assembly.
Figures 16A, 16B:
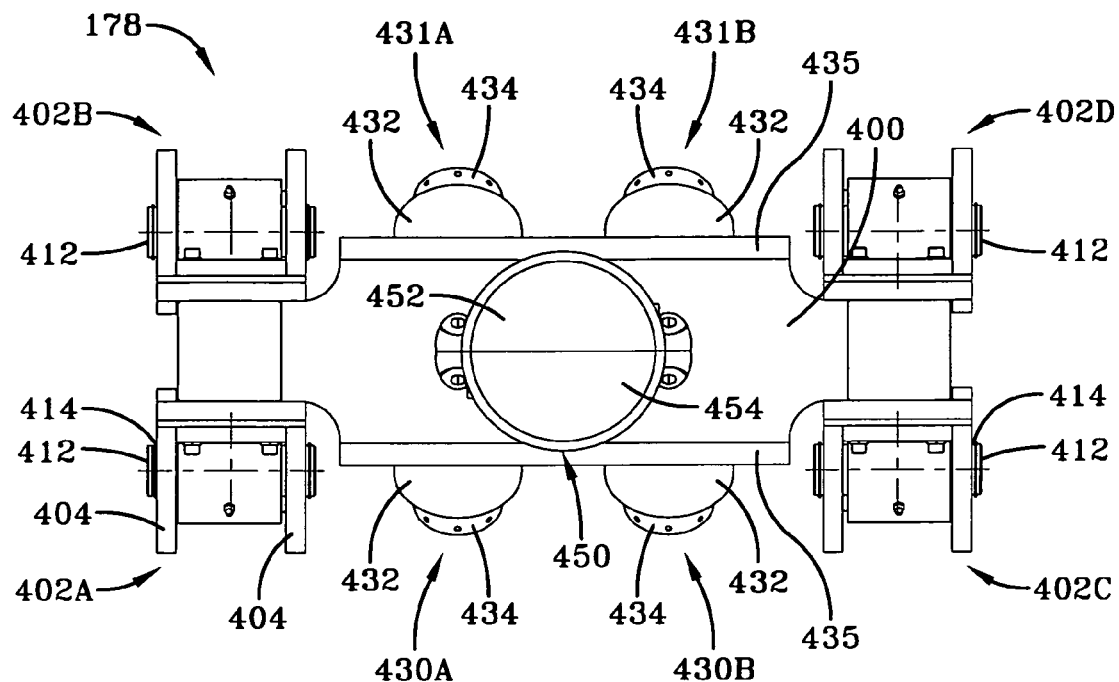
FIG. 16A is a top plan view of the bogie wheel assembly.
FIG. 16B is an elevational view of the bogie wheel assembly.

The bogie wheel assembly 178 that is used for the docking carts 114, 115 and the mooring carts 116,117 is shown in FIGS. 16 and 16A. Generally, the bogie wheel assembly 178 facilitates the movement of the docking carts 114,115 and mooring carts 116,117 as they move along the rails of their respective track systems 110 and 112. The bogie wheel assembly 178 comprises an elongated base 400 that has extending therefrom two (2) sets of opposing claw assemblies 402A,402B, and 402C,402D, with one (1) set attached to each end of the base 400. The opposing sets of claw assemblies 402A, 402B and 402C, 402D, due to their curved construction serves to retain or trap the rails of the corresponding track systems 110,112 for which the bogie wheel assemblies 178 are used, while providing rolling action over such rails.

For clarity, only claw assembly 402A will be discussed below as it is equivalent to claw assemblies 402B, 402C, and 402D. Specifically, claw assembly 402A includes two (2) curved parallel guides 404 separated by a pivot block 406 that is attached to the end of the base 400. Each of the guides 404 are connected at one end by a stopper 408 and at another end by a mounting plate 410. Additionally, claw assembly 402A is pivotally mounted to pivot block 406 by a pivot member 412 that is retained in position at each end by a retaining clip 414. A bumper 415 may be removably attached to the front surface of the stopper 408 to provide a spring force allowing the claw assembly 402A to bias various rollers so that they maintain contact with the various rails provided by the ground handling system 100. It should also be appreciated that shims may also be added to provide the desired contact force between the various rollers of the bogie wheel assembly 178 with the various rails of the ground handling system 100. The bumper 415 is constructed from rubber or other resilient type material that biases or otherwise maintains roller contact with the rail, and reduces vibration and noise generated as the bogie wheel assembly 178 rolls upon on the various rails of track systems 110 and 112. The claw assembly 402A is biased, such that the bumper 415 is in constant contact on a resting edge 416 (shown more clearly with respect to claw assembly 402B) of pivot block 406. Various grease fittings 417 may also be provided by the pivot block 406 to lubricate the pivot members 412 within the pivot block 406.

In a region between the two (2) sets of claw assemblies 402A;402B and 402C;402D two (2) sets of opposing roller assemblies 430A-B and 431A-B (shown clearly in FIG. 16B) are mounted. The roller assemblies 430A-B and 431A-B comprise upper rollers 432 rotatably mounted via suitable bearings to roller supports 434 that are attached to angled surfaces 435 on each side of the base 400. In addition, lower rollers 436 are mounted to the mounting plate 410 of each of the claw assemblies 402A-D. The upper rollers 432, and lower rollers 436 serve to trap the various cylindrical-shaped rails of the first and second track systems 110,112 within a rolling cavity 437, shown clearly in FIG. 16B.

In one embodiment of the bogie wheel assembly 178, when a rail is received by the bogie wheel assembly 178, upper rollers 432 are positioned above the horizontal midline of the rail, and lower rollers 436 are positioned below the horizontal midline of the rail, although other configurations may be used for the ground handling system 100.

To attach the bogie wheel assemblies 178 to the docking carts 114 and 115, and to the mooring carts 116 and 117, an attachment projection 450 is provided. The attachment projection 450 is cylindrical and is centrally located about the top surface of and extends from the elongated base 400 of the bogie wheel assembly 187. Specifically, the attachment projection 450 comprises first and second sections 452 and 454 that are affixed together with suitable fasteners. As shown in FIG. 16B, the attachment projection 450 houses and retains bearings 456 and 458 that allow the attachment projection 450 to rotate freely about a shaft 460 that is affixed to the top surface of the base 400. Within the attachment projection 450 is a mounting aperture 462 that may receive a suitable fastener to allow the bogie wheel assembly 178 to be attached to the forward and aft docking carts 114 and 115 via L-shaped mounting brackets 181A and 181B, as shown and discussed with respect to FIGS. 10 and 11. Additionally, the mounting apertures 462 also allow the bogie wheel assemblies 178 to be mounted to the mooring carts 116,117 via the bogie wheel attachment assemblies 350 previously discussed.

Figure 17:
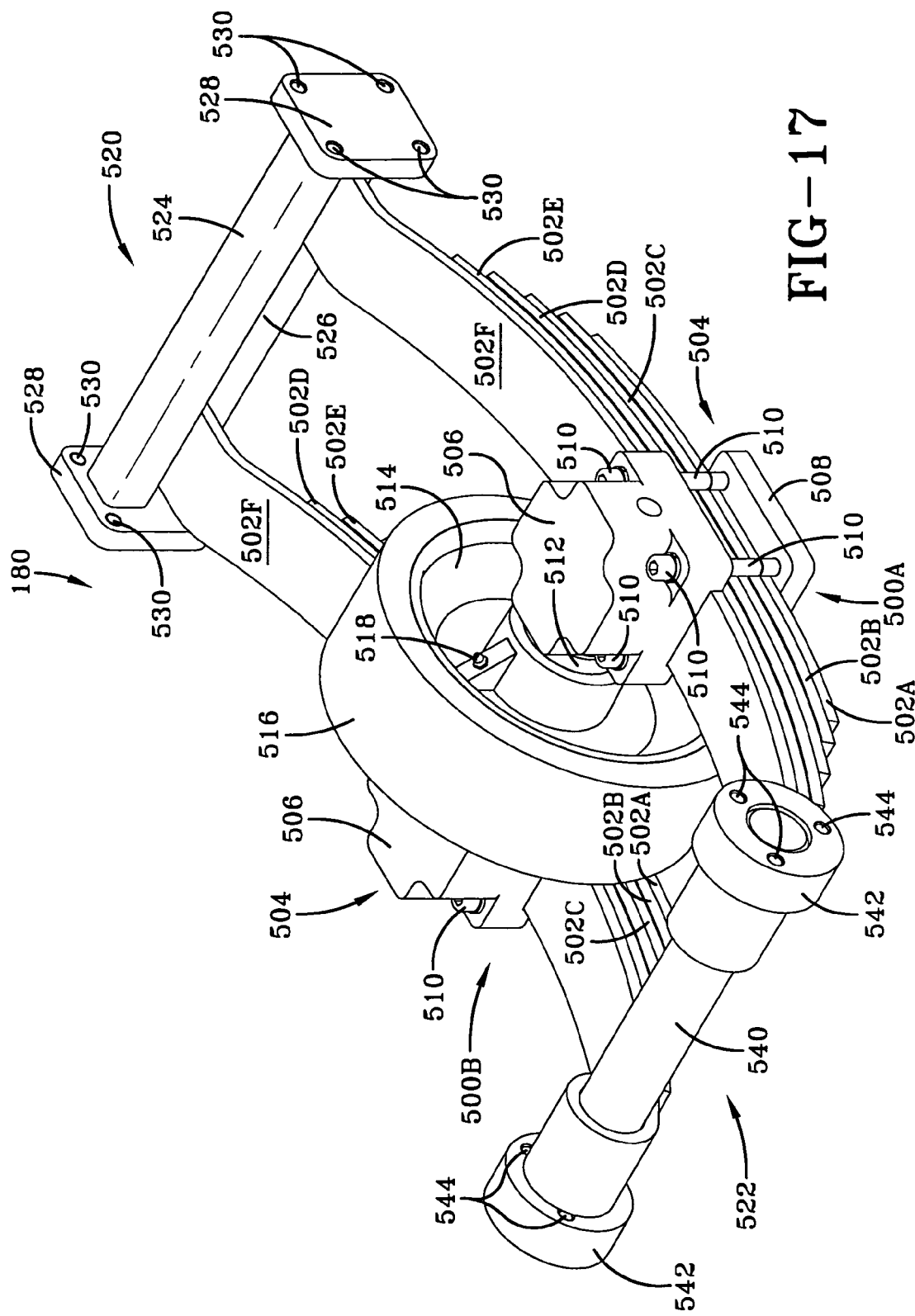
FIG. 17 is a perspective view of an outrigger wheel assembly.
Figure 18:
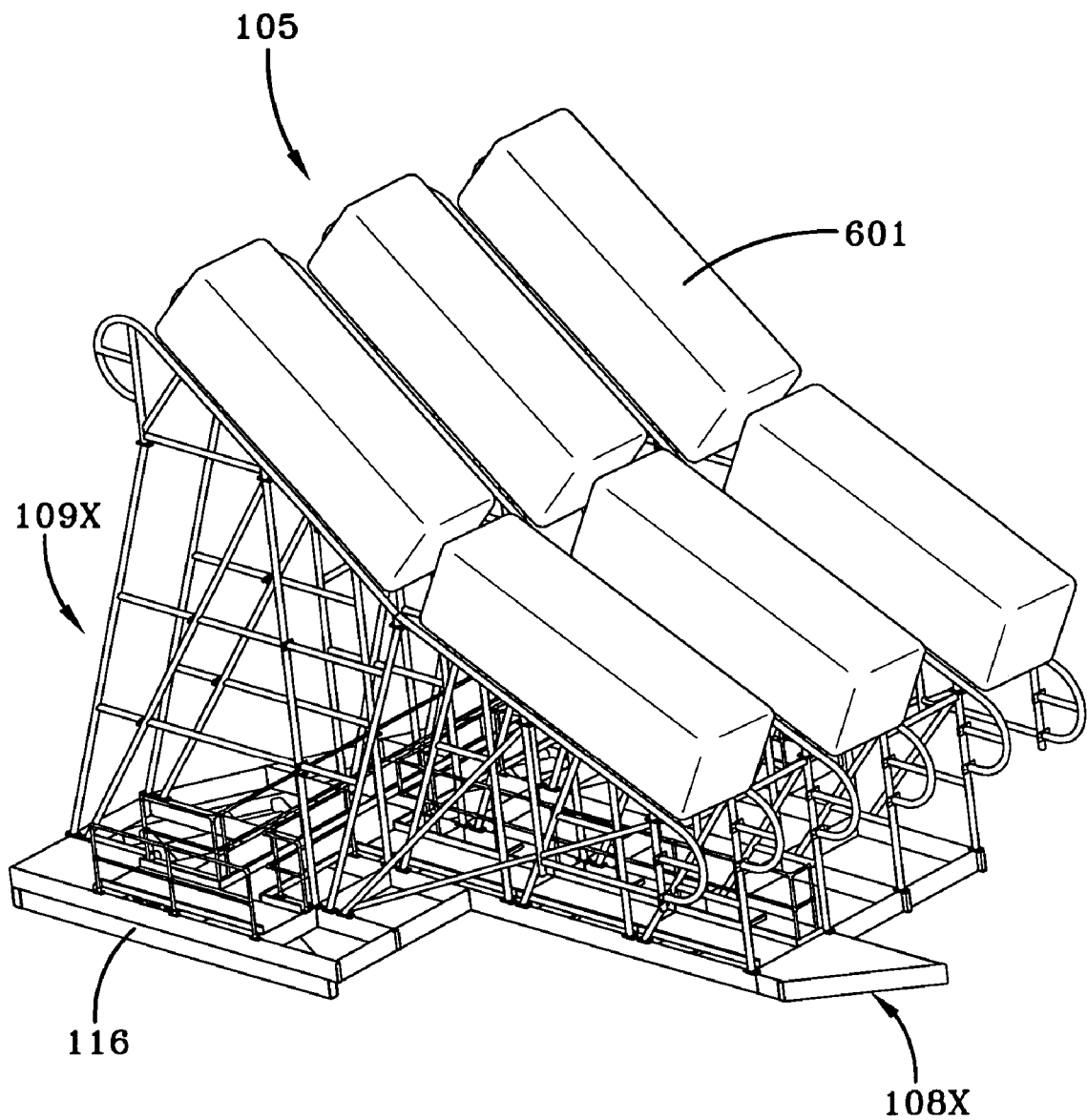
FIG. 18 is a perspective view of the forward starboard mooring structure with attached mooring cart.

Continuing to FIG. 17, the outrigger wheel assembly 180 that is utilized by docking carts 114 and 115 is shown. It should also be appreciated that the outrigger wheel assembly 180 may also be utilized in conjunction with the aft mooring carts 117A and 117B of the ground handling system 10 in lieu of the stabilizing outriggers 386,388 shown in FIG. 15A. The outrigger wheel assembly 180 comprises a set of two (2) leaf spring assemblies 500A and 500B situated in a spaced apart, parallel arrangement. Because the leaf spring assemblies 500A and 500B are equivalent, the following discussion will relate only to leaf spring assembly 500A. The leaf spring assembly 500A comprises individual stacked leaves 502A-F, whereby each leaf 502A-F is progressively shorter in length than the leaf above (uppermost leaf 502F being the longest and lowermost leaf 502A being the shortest). The leaves 502A-F are clamped together about their midpoints by a spring clamp assembly 504 comprising clamping members 506 and 508. Clamping members 506 and 508 are joined together by suitable fasteners 510. Mounted between the leaf spring assemblies 500A and 500B is a shaft (not shown), the ends of which are held in place by the spring clamp assemblies 504. Rotatably attached to the shaft via suitable bearings 512 is a hub 514 upon which a wheel 516 is disposed. To facilitate the lubrication of the bearings 512, via a grease gun for example, a grease fitting 518 is provided in the hub 514. First and second mounting brackets 520 and 522 are used to retain each end of the upper most leaf 502F. The first mounting bracket 520 comprises a first retaining member 524 and a second retaining member 526 that are oriented in parallel and provide a space allowing the flat end of the uppermost leaf 502F disposed therebetween to slide while still being held in place. The first and second retaining members 524, 526 are attached on each end to a set of two (2) opposing mounting flanges 528. Each mounting flange contains a plurality of apertures 530 to receive a suitable fastener to attach the outrigger assembly 180 to the docking carts 114 and 115 between various parallel beams and strut members as previously discussed. The second end of the upper most leaf 502F is attached to the second mounting bracket 522 by sliding the preformed rolled end of the uppermost leaf 502F over a mounting rod 540. Attached to each end of the mounting rod 540 is a pair of mounting discs 542, which contain apertures 544 for receiving suitable fasteners. The mounting discs 542 and apertures 544 facilitate the mounting of the outrigger assembly to the docking cart 114 and 115 between various parallel beams and strut members as previously discussed.

The mooring structures 104, 105, 106, and 107 shown in FIGS. 1A-B provide suitable surfaces to cradle the airship as it is moved between weathervane/launching/landing ring R, and the hangar 101. Because starboard forward and aft mooring structures 105 and 107 are mirror images, and thus substantially the same as port forward and aft mooring structures 104 and 106, only the forward and aft starboard mooring structures 105 and 107 will be discussed. The forward starboard mooring structure 105 as shown in FIGS. 3, and 18-20 includes the forward scaffolding system 109X and the forward mooring platform 108X (shown more clearly in FIG. 19). Returning to FIG. 3, the scaffolding system 109X comprises a plurality of spaced angled support structures 600A-F. On top of these support structures 600A-F a plurality of cushion supports 601 (shown in FIG. 18) are mounted, allowing the mooring structure 105 to absorb a large portion of the energy imparted to it upon the capture of the airship during landing. The cushion supports 601 also serve to protect the outer skin of the airship from tearing or abrasion, and allow the airship to be cradled securely within each of the mooring structures 104, 105, 106, and 107.

Except for minor variations that will be discussed later, the contoured support structure 600A is substantially the same as support structures 600B-F, thus for clarity only support structure 600A will be discussed in detail. Support structure 600A comprises an angled support member 602 that includes an upper section 602A and a lower section 602B, with each end of sections 602A, and 602B terminated with curved ends 604. Sections 602A and 602B are suitably angled with respect to each other at ends 603A and 603B to create the desired contour to cradle the airship suitably. The upper section 602A is supported by upper members 606A-C, each of which have suitable lengths to accommodate the angle of the upper section 602A. Specifically, upper members 606A-C are arranged in a splayed manner, such that their relative spacing becomes greater as the upper members 606A-C extend from a mounting point on mooring platform 108X toward the upper section 602A. While upper members 606B and 606C attach directly to the upper section 602A, upper member 606A attaches to an intermediate member 607, which is attached to the upper section 602A of the angled support section 602.

To support the lower section 602B of the angled support member 602, a plurality of lower support members 608A-D are provided. Support members 608A and 608B are connected at one end to the lower angled section 602B, and at their other end to mooring platform 108X. Whereas support members 608C and 608D are attached at one end to the lower angled section 602B, without direct attachment to the mooring platform 108X. To provide additional torsional support to the scaffolding system 109X, a plurality of substantially horizontal cross members 610A-I are interspersed between each of the upper and lower members 606A-C and 608A-D. Moreover, cross members 610A and 610I are attached to the inner radius of respective curved end 604 and to respective lower member 608D and intermediate member 607. A plurality of angled members 612A-B are also attached between various support members to provide additional structural support.

Because the one end of the lower section 602B is not directly supported by the forward mooring platform 108X, an extension member 614 is provided. The extension member 614 extends in an angled manner from its point of attachment on the mooring platform 108X to a point on the lower member 608C.

Each of the angled support structures 600A-E are separated by scaffold struts 616A-J that are attached at various points between the upper and lower members 606 and 608. Furthermore, it should be appreciated that support structure 600A is equivalent to support structures 600B-E, except for the relative spacing of the various associated members and sections.

Figure 19:
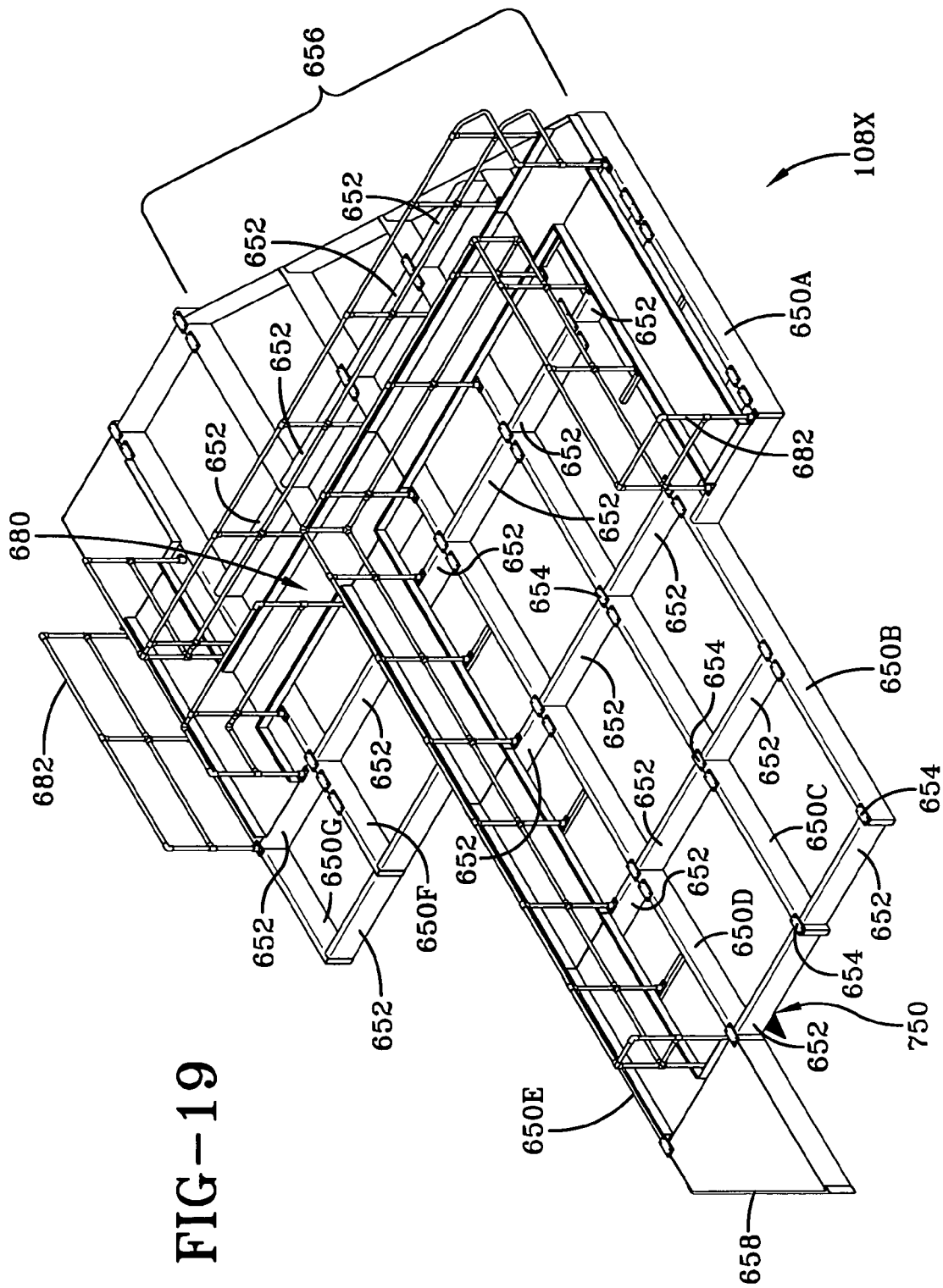
FIG. 19 is a top perspective view of the forward starboard mooring platform.

To support the forward scaffolding system 109X of the forward starboard mooring structure 105, the forward mooring platform 108X is used, which comprises a plurality of spaced, parallel platform members 650A-G as shown in FIG. 19. Separating each of the platform members 650A-G, are a plurality of interspersed platform struts 652 that are substantially perpendicularly attached between the platform members 650A-G via a plurality of attachment plates 654. Suitable fasteners may be used to attach the plates 654 to the platform members 650A-G and platform struts 652. The attachment plates 654 are also used to facilitate the attachment of the scaffolding system 109X to the mooring platform 108X.

The arrangement of platform members 650A-E may be tapered, to create a first angled edge 656. Additionally, platform members 650D and 650E may extend away from platform members 650B and 650C in a tapered manner to create a second angled edge 658.

A walkway 680 is attached to the top portion of the forward mooring platform 108X and has a suitable layout such that it avoids obscuring the various platform members and platform struts used to mount and support the scaffolding system 109X to the mooring platform 108X. A guardrail system 682 is provided along various portions of the walkway 680 to provide safety.

Figure 20:
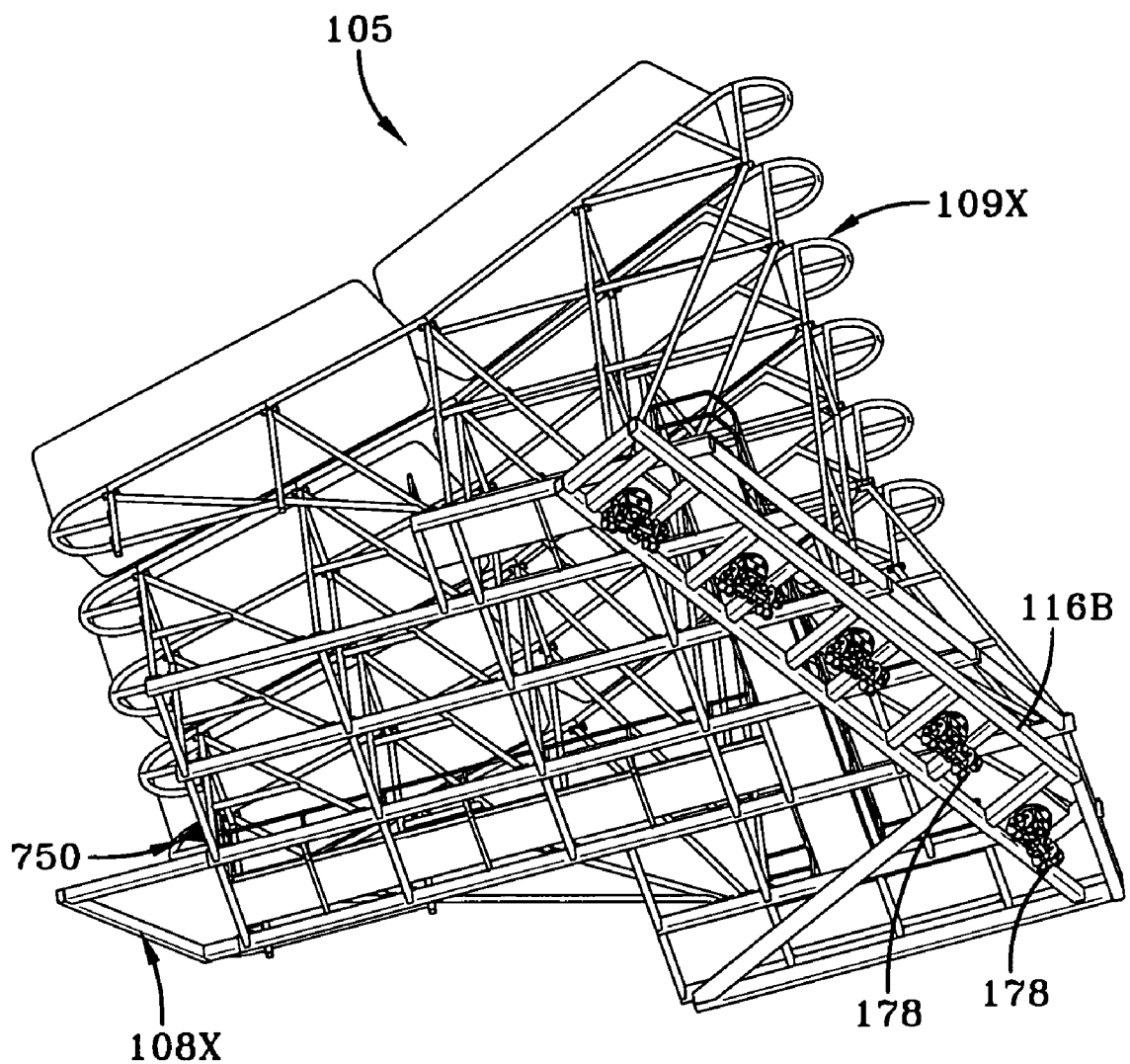
FIG. 20 is a bottom perspective view of the forward starboard mooring structure with attached mooring cart.

FIG. 20 shows the forward starboard mooring structure 105 including the forward starboard mooring cart 116B with attached bogie wheel assemblies 178 attached to the bottom of the mooring platform 108X. The mooring cart 116B allows the mooring structure 105 to move about the second rail system 112 when the second inner rail 152 is completed by the forward starboard docking cart 114B. It should also be appreciated that the forward starboard mooring platform 108X may include a winch 683 as shown in FIG. 5. Various optional handling lines provided by the airship may be attached to the winch 683 to assist in the capture or release the airship.

Figure 21:
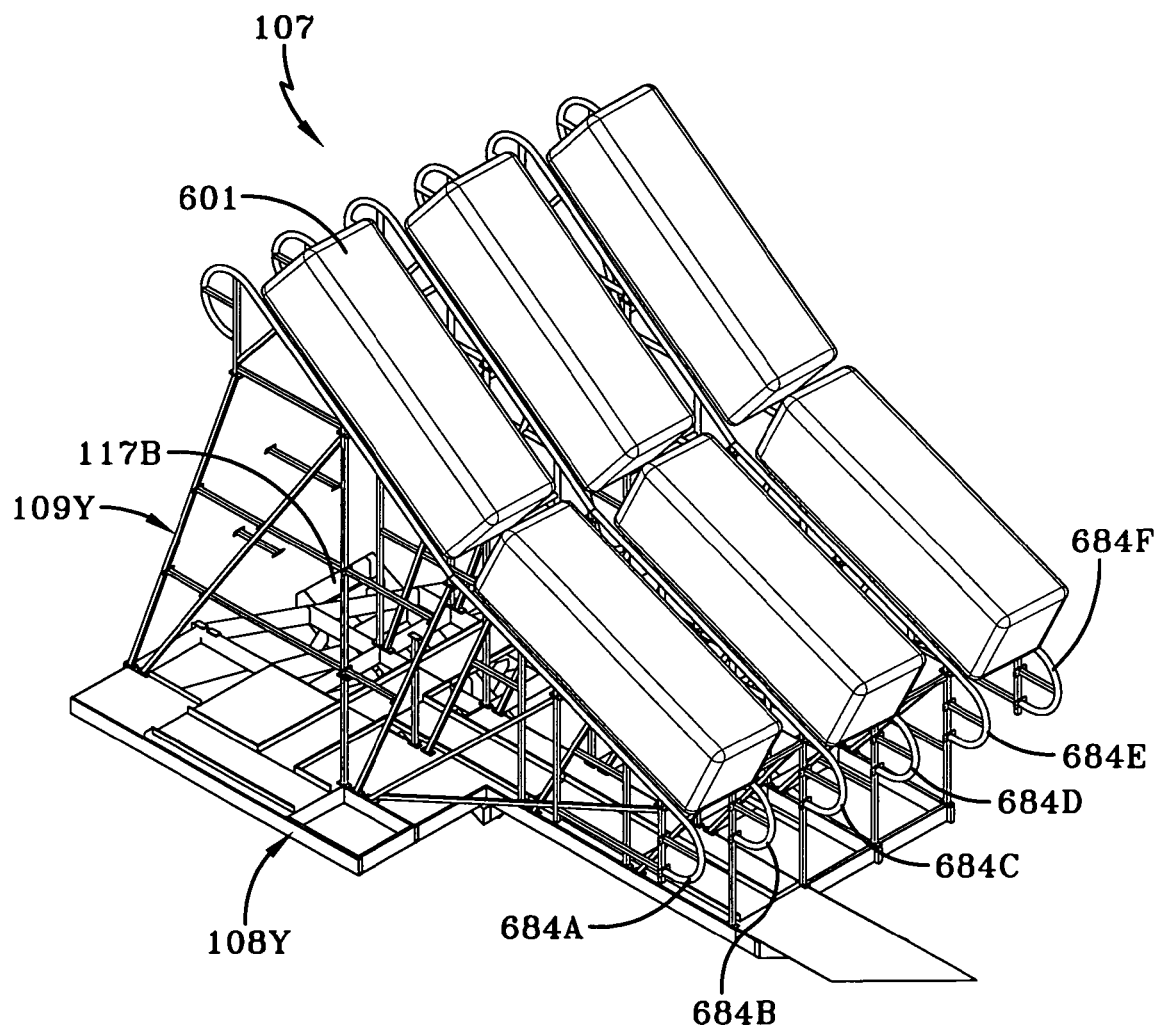
FIG. 21 is a perspective view of the aft starboard mooring structure with attached mooring cart.
Figure 22:
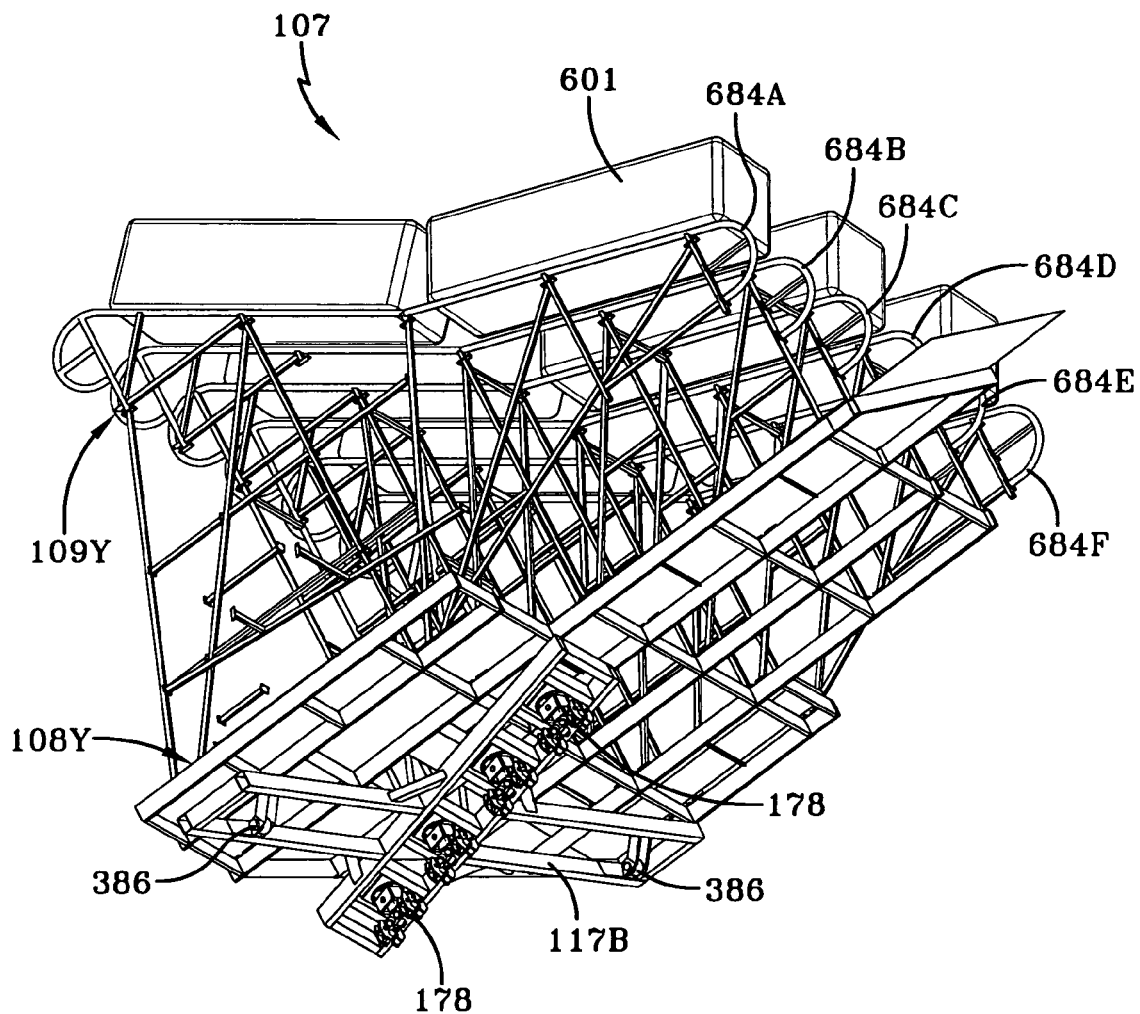
FIG. 22 is a bottom perspective view of the aft starboard mooring structure with attached mooring cart.
Figure 23:
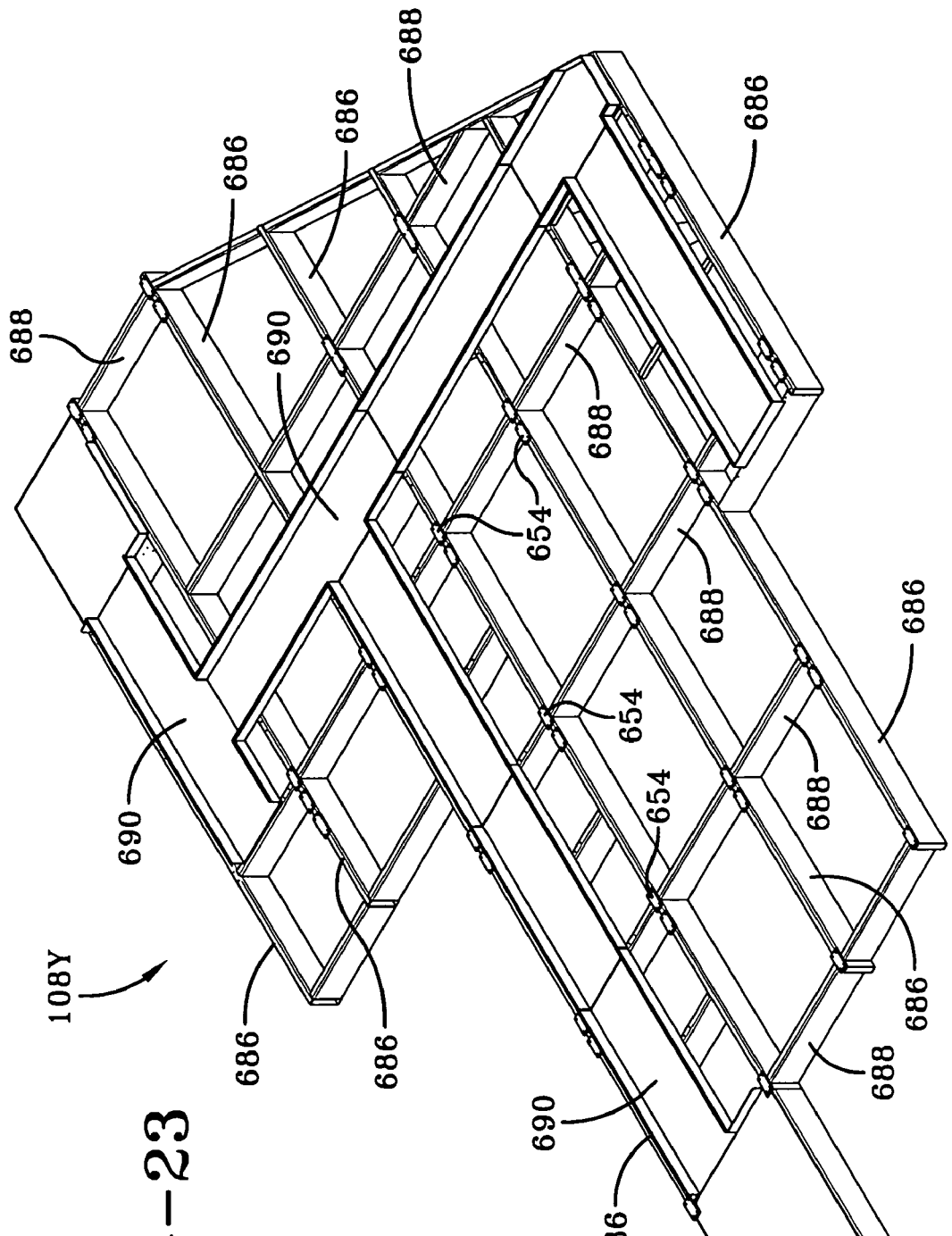
FIG. 23 is a top perspective view of the aft starboard mooring platform.

Continuing, FIGS. 21-23 show the aft starboard mooring structure 107, which includes the aft scaffolding system 109Y mounted upon the aft mooring platform 108Y. The aft scaffolding system 109Y, and aft mooring platform 108Y are substantially equivalent to the forward scaffolding system 109X, and the forward mooring platform 108X of the forward starboard mooring structure 105 previously discussed. Therefore, only a brief discussion of the components relating to the aft starboard mooring structure 107 will be provided. Specifically, the aft scaffolding system 109Y comprises a plurality of substantially parallel support structures 684A-F that are coupled to the aft mooring platform 108Y. The supports structures 684A-F provide a suitable surface for the cushion supports 601 to be mounted, and provide a suitable contour to allow the airship to be cradled when moved between the weathervane/launching/landing ring R and the hangar 101. Further, the aft mooring platform 108Y is comprised of platform members 686, and platform struts 688 that intersect each other, providing support for various walkways 690 and the support structures 684A-F that are disposed thereon. The aft scaffolding system 109Y and aft mooring platform 108Y ride upon aft mooring cart 117B, which allows the aft starboard mooring structure 107 to move along the ring track system 112 when the outer rail 154 is completed by the aft starboard docking cart 115B. Furthermore, the aft mooring platform 108Y as shown in FIG. 6 may also include the winch 683 that may be used to attach various optional handling lines provided by the airship to capture or release the airship if desired.

Figure 24:
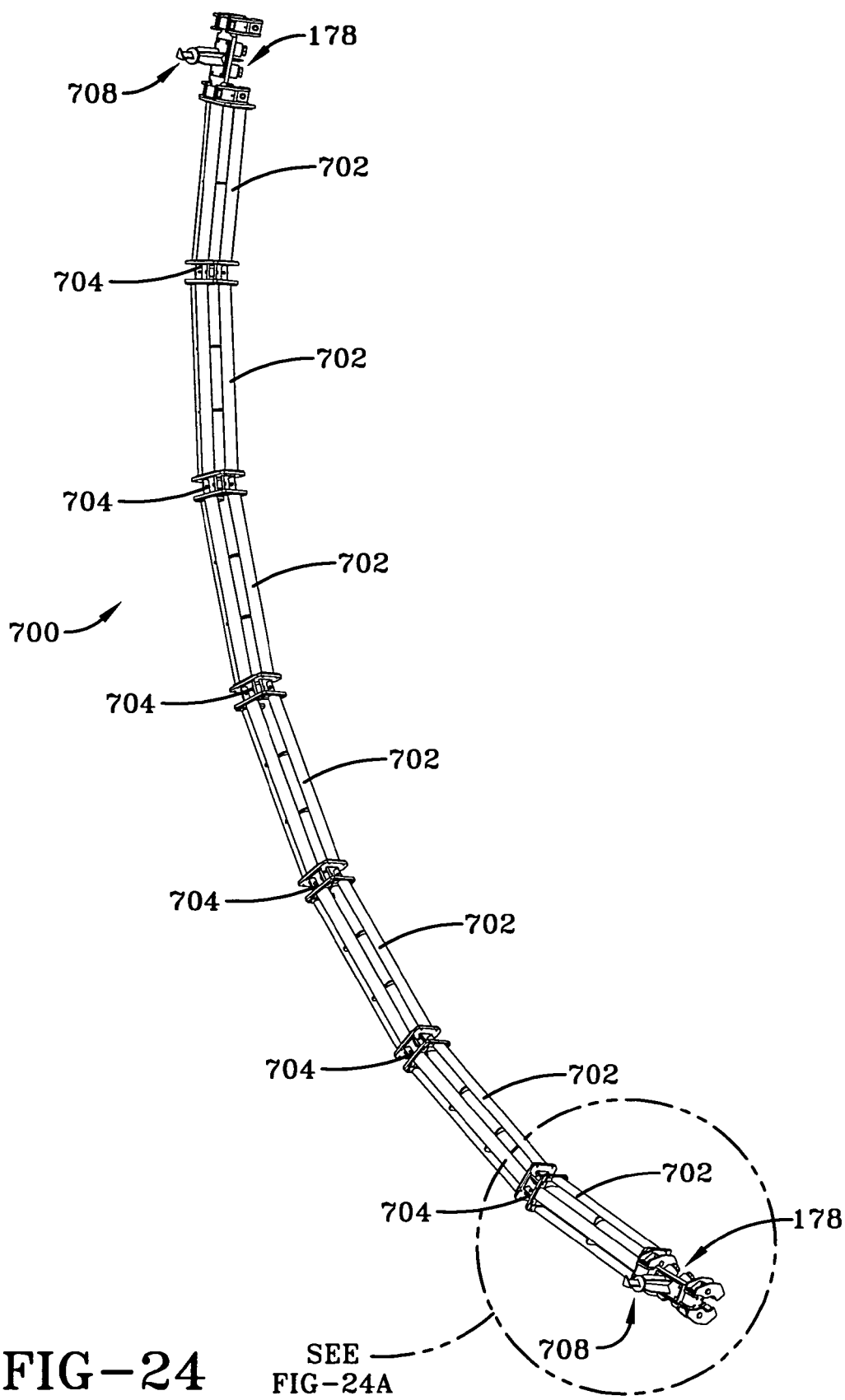
FIG. 24 is a perspective view of a bogie train used to connect the forward starboard and forward port mooring structures.
Figure 24A:
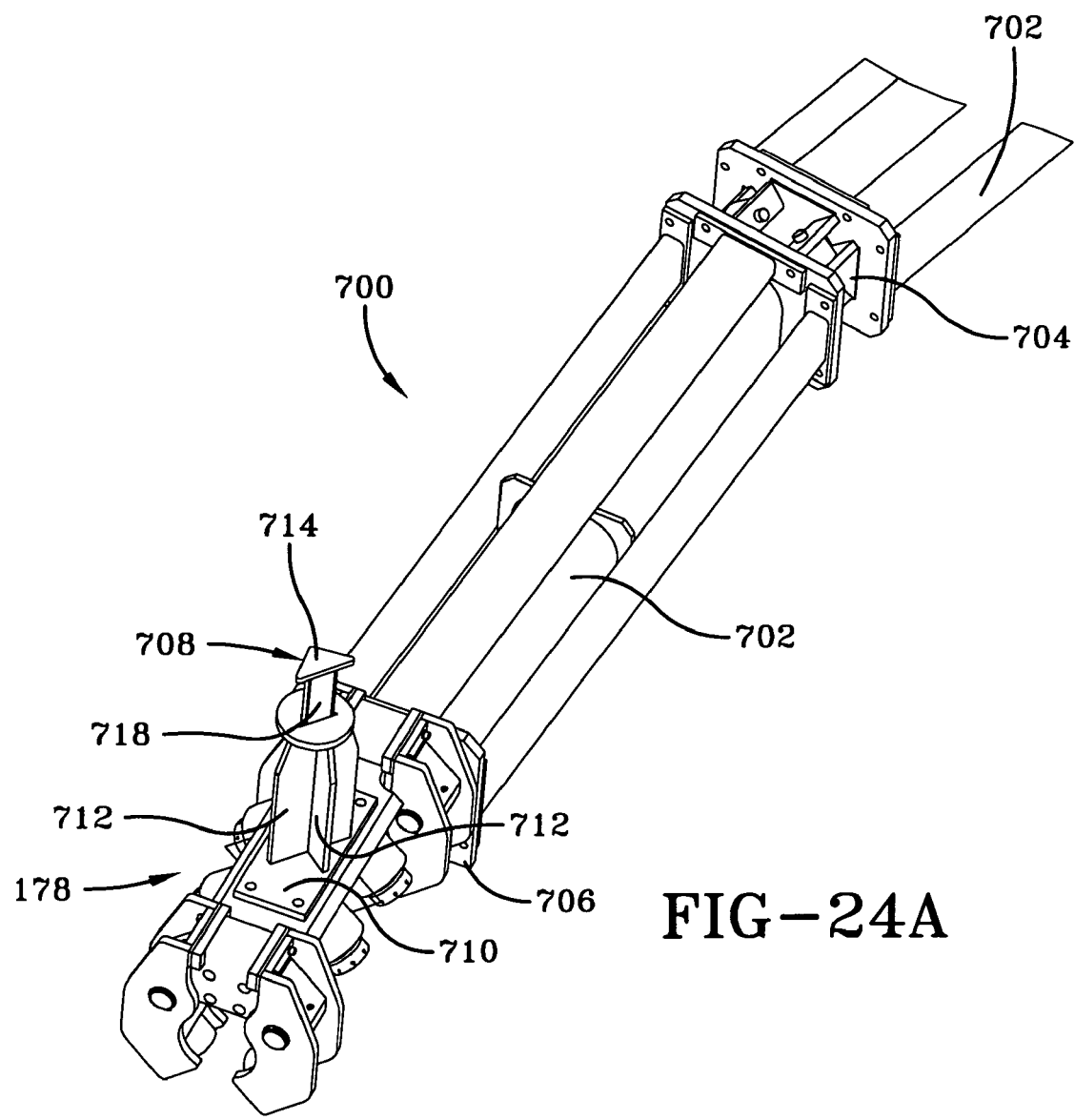
FIG. 24A is a detailed perspective view of an attachment post of the bogie train.

In order to allow the mooring structures 104, 105, 106, and 107 to move in unison about the ring track system 112, a bogie train 700, as shown in FIGS. 24 and 24A, is disposed on the first inner annular rail 150. The bogie train 700 comprises a plurality of straight train segments 702 that are separated from each other by train brackets 704. The train segments 702 and train brackets 704 are configured to receive the first inner annular rail 150. Additionally, the train brackets 704 are configured to provide a suitable amount of curvature needed to allow the straight train segments 702 to move along the first inner annular rail 150. Each end of the bogie train 700 comprises a mounting flange 706 to which the bogie wheel assembly 178 is attached. However, an attachment post 708 is attached to the base 400 of the bogie wheel assembly 178 in lieu of the mounting projection assembly 450 previously discussed with respect to the docking carts 114,115 and mooring carts 116,117.

The attachment post 708, shown clearly in FIG. 24A comprises a base 710 mounted to the base 400 of the bogie wheel assembly 178. Extending perpendicularly from the base 710 is a plurality of radiating members 712, on top of which is disposed a first capture member 714 and a second capture member 716. The first capture member 714 and the second capture member 716 may be respectively circular and triangular in shape, and are separated at a distance defining a hitch surface 718, enabling the attachment post 708 to be captured by a hitch 750 that is attached to the forward mooring platforms 108X of forward port and starboard mooring structures 104,105.

Figure 25:
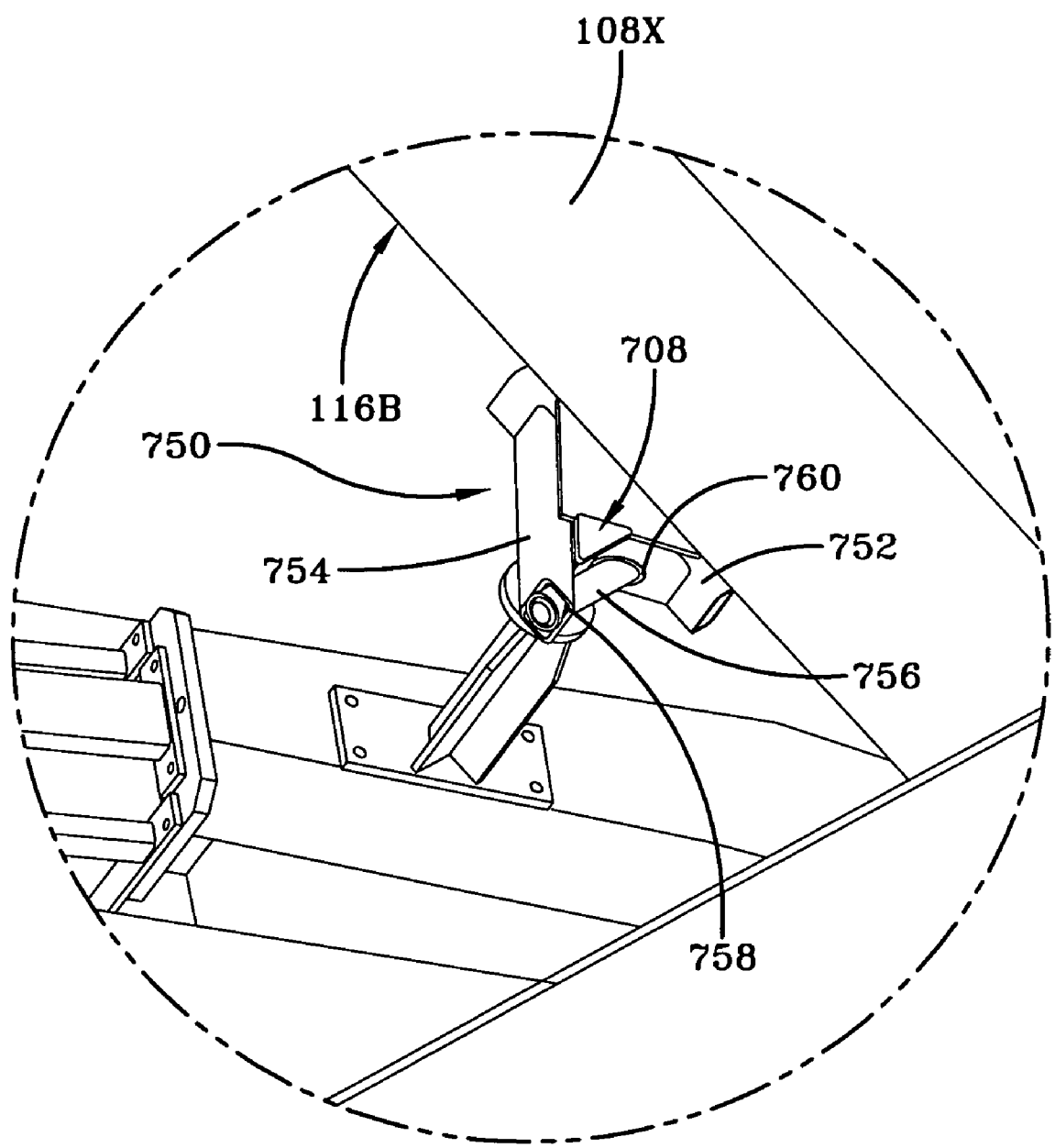
FIG. 25 is a detailed perspective view of a hitch of the forward starboard and port mooring platform.

The hitch 750, shown in FIG. 25, comprises a first hitch member 752 mounted underneath each mooring platform 108X. A second hitch member 754 extends outward from the mooring platform 108X from the first hitch member 752 at an angle. A pin 756 passes through an aperture 758 in the free end of the second hitch member 754, and is removably received in a recess 760 within the first hitch member 752. Thus, the bogie train 700 can be released from each of the forward mooring structures 104,105 by releasing the pin 756 from the recess 760 to free the attachment post 708 of the bogie train 700.

It will, therefore, be appreciated that one advantage of one or more embodiments of the ground handling system in accordance with the concepts of the present invention is that no external structures except for handling lines are attached to the airship in order to maneuver the airship on the ground. Still another advantage of the ground handling system is that no battens, or nose cones need to be attached to the hull or envelope of the airship to retrieve the airship from flight. An additional advantage of the ground handling system is that mooring masts do not need to be attached to the airship for ground handling. Yet another advantage of the ground handling system is that the mooring structures can be oriented to a desired position to facilitate the launch or capture of the airship without requiring the airship to fly with external handling lines.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A ground handling system for an airship comprising:
a ring track system;
a straight track system intersecting said ring track system so as to form gaps therein; and
a plurality of docking carts configured to move on said straight track system, said plurality of docking carts each carrying thereupon a mooring cart configured to move on said ring track system, wherein said plurality of docking carts complete said gaps of said ring track system to enable said mooring carts to move on said ring track system while cradling the airship disposed thereupon.

2. The ground handling system of claim 1, wherein said straight track system comprises a first rail and a second rail.

3. The ground handling system of claim 1, wherein said ring track system comprises:
an outer rail; and
a first inner rail within a second inner rail;
wherein said first inner rail and second inner rails are within said outer rail.

4. The ground handling system of claim 3, wherein said outer rail, and said first and second inner rails are substantially circular.

5. The ground handling system of claim 3, wherein said second inner rail comprises a first inner section and a second inner section separated by inner rail gaps.

6. The ground handling system of claim 5, wherein said outer rail comprises a first outer section, and a second outer section separated by outer rail gaps.

7. The ground handling system of claim 6, wherein said inner rail gaps in said second inner rail and said outer rail gaps allow said straight track system to pass through.

8. The ground handling system of claim 1, wherein said plurality of docking carts comprise:
a frame having a first surface and a second surface;
a plurality of outrigger wheel assemblies attached to the second surface of said frame;
a plurality of bogie wheel assemblies attached to the second surface of said frame; and
an arc-shaped rail section attached to the first surface of said frame;
whereby said plurality of outrigger wheel assemblies and bogie wheel assemblies allow the docking cart to move on said straight track system.

9. The ground handling system of claim 8, wherein said outrigger wheel assemblies comprise:
a pair of spaced apart springs; and
a wheel rotatably attached between said pair of springs.

10. The ground handling system of claim 9, wherein said pair of spaced apart springs comprise leaf springs.

11. The ground handling system of claim 9, wherein the first end of the spring is attached to a first mounting bracket, and the second end of the spring is attached to a second mounting bracket.

12. The ground handling system of claim 8, wherein said plurality of bogie wheel assemblies comprise:
a base having a first end and a second end, and a first surface;
a first pair of claw assemblies attached to the first end of said base;
a second pair of claw assemblies attached to the second end of said base;
a plurality of rollers attached to said claw assemblies and said base configured to trap the rails of said straight track system so as to allow said docking carts to move along said straight track system; and
a mounting projection assembly attached to said first surface of said base.

13. The ground handling system of claim 12, wherein a first portion of said plurality of rollers attached to the claw assemblies are positioned below the midline of the rail, and wherein a second portion of said plurality of rollers attached to said base are positioned above the midline of the rail.

14. The ground handling system of claim 1, wherein said mooring cart comprises:
a first cart surface opposite a second cart surface; and
a plurality of bogie wheel assemblies attached to the second cart surface to allow the mooring cart to move along said ring track system.

15. The ground handling system of claim 14, wherein said bogie wheel assemblies comprise:
a base having a first end and a second end, and a first bogie wheel surface;
a first pair of claw assemblies attached to the first end of said base;
a second pair of claw assemblies attached to the second end of said base;
a plurality of rollers attached to said claw assemblies and said base configured to engage the rails of said ring track system so as to allow said mooring carts to move along said ring track system; and
a mounting projection assembly attached to said first bogie wheel surface of said base.

16. The ground handling system of claim 15, wherein a first portion of said plurality of rollers are attached to the claw assemblies below the midline of the rails, and wherein a second portion of said plurality of rollers attached to said base are above the midline of the rails.

17. The ground handling system of claim 1, wherein said mooring cart has a first surface and a second surface, and further comprises a mooring structure attached to said first surface of said mooring cart, said mooring structure adapted to cradle an airship.

18. The ground handling system of claim 17, wherein said mooring structure includes a first surface and a second surface, said mooring structure comprising:
a mooring platform attached to a first surface of said mooring cart; and
a scaffolding system attached to said mooring platform.

* * * * *